US011989995B2

(12) United States Patent
Tanaka et al.

(10) Patent No.: US 11,989,995 B2
(45) Date of Patent: May 21, 2024

(54) COIN FEEDING DEVICE

(71) Applicant: Glory Ltd., Hyogo (JP)

(72) Inventors: Hidekazu Tanaka, Hyogo (JP); Mitsuo Tanaka, Hyogo (JP); Kota Kobayashi, Hyogo (JP); Shuji Onishi, Hyogo (JP)

(73) Assignee: GLORY LTD., Himeji (JP)

( * ) Notice: Subject to any disclaimer, the term of this patent is extended or adjusted under 35 U.S.C. 154(b) by 166 days.

(21) Appl. No.: 17/349,915

(22) Filed: Jun. 17, 2021

(65) Prior Publication Data

US 2021/0398380 A1 Dec. 23, 2021

(30) Foreign Application Priority Data

Jun. 19, 2020 (JP) ................................ 2020-106023

(51) Int. Cl.
*G07D 3/12* (2006.01)
*G07D 1/00* (2006.01)
*G07D 5/00* (2006.01)

(52) U.S. Cl.
CPC ............... *G07D 3/128* (2013.01); *G07D 1/00* (2013.01); *G07D 5/005* (2013.01); *G07D 2205/00* (2013.01)

(58) Field of Classification Search
CPC .......... G07D 3/128; G07D 1/00; G07D 5/005; G07D 2205/00; G07D 9/008; G07D 3/14
USPC .......................................... 453/6, 10, 49, 57
See application file for complete search history.

(56) References Cited

U.S. PATENT DOCUMENTS 5,931,731 A * 8/1999 Chwalisz ................ G07D 9/04 453/32
2004/0238320 A1* 12/2004 Hino ....................... G07D 3/00 194/302
2008/0090509 A1* 4/2008 Enomoto ............... G07D 9/008 453/57
2012/0238196 A1* 9/2012 Umeda .................. G07D 3/128 453/3
2014/0170948 A1* 6/2014 Enomoto ................ G07D 3/06 453/3
2016/0240027 A1* 8/2016 Onishi .................. G07D 9/008
(Continued)

FOREIGN PATENT DOCUMENTS

CA 2170750 A1 3/1995
JP 2012-174035 A 9/2012
WO 2018/101173 A1 6/2018

OTHER PUBLICATIONS

Extended European search report dated Nov. 15, 2021, in corresponding European patent Application No. 21176697.7, 8 pages.

*Primary Examiner* — Jeffrey A Shapiro
(74) *Attorney, Agent, or Firm* — XSENSUS LLP

(57) ABSTRACT

A coin feeding device (for example, feeding unit 20) includes: a disk 22 having a plurality of protrusions **22*b* at a surface, the disk 22 disposed so as to be rotatable in a tilted state and configured to catch coins by the protrusions 22*b* to move the coins upward while rotating; a cover 21 configured to form a space for storing a coin between the cover 21 and the surface of the disk 22; a guide 26 configured to guide a peripheral edge of a coin such that a part of the coin having been caught by each protrusion 22*b* and moved upward protrudes from the disk 22; and a taking-out unit (for example, taking-out mechanism 28) configured to grip only one coin protruding from the disk 22, remove the coin from the disk 22, and discharge the coin to outside of the disk 22**.

20 Claims, 19 Drawing Sheets

(56) References Cited

U.S. PATENT DOCUMENTS

| | | | | |
|---|---|---|---|---|
| 2016/0364933 | A1* | 12/2016 | Enomoto | G07D 9/008 |
| 2020/0160642 | A1* | 5/2020 | Griese | G07D 5/02 |

* cited by examiner

COIN FEEDING DEVICE

CROSS-REFERENCE TO RELATED APPLICATION

This application claims priority to Japanese Patent Application No. 2020-106023 filed on Jun. 19, 2020, the entire contents of which are incorporated herein by reference.

TECHNICAL FIELD

The present invention relates to a coin feeding device for storing coins and feeding out the stored coins.

BACKGROUND ART

To date, various kinds of coin feeding devices for storing coins and feeding out the stored coins have been known. For example, Japanese Laid-Open Patent Publication No. 2012-174035 (JP2012-174035A) discloses a coin feeding device that uses a guide member to prevent two or more coins from being simultaneously fed out to outside of a rotary disk.

SUMMARY

A coin feeding device of the present invention includes a disk having a plurality of protrusions on a surface, the disk disposed so as to be rotatable in a tilted state, the disk configured to catch coins by the protrusions to move the coins upward while rotating; a cover configured to form a space for storing a coin between the cover and the surface of the disk; a guide configured to guide a peripheral edge of a coin such that a part of the coin having been caught by each protrusion and moved upward protrudes from the disk; and a taking-out unit configured to grip one coin protruding from the disk, remove the coin from the disk, and discharge the coin to outside of the disk.

BRIEF DESCRIPTION OF THE DRAWINGS

FIG. 3 is a configuration diagram illustrating in detail configurations of a feeding unit, a transport unit, sorting units, and the like of the coin depositing and dispensing machine shown in FIG. 1 and the like;

FIG. 4 is a block diagram illustrating a functional configuration of the coin depositing and dispensing machine shown in FIG. 1 and the like;

FIG. 9 is an exploded perspective view of a body portion, a first gripping member, and a second gripping member of the taking-out mechanism shown in FIG. 6 and the like;

FIG. 10 is a top view of the body portion, the first gripping member, and the second gripping member of the taking-out mechanism shown in FIG. 6 and the like;

DESCRIPTION OF THE EMBODIMENTS

Figure 1:
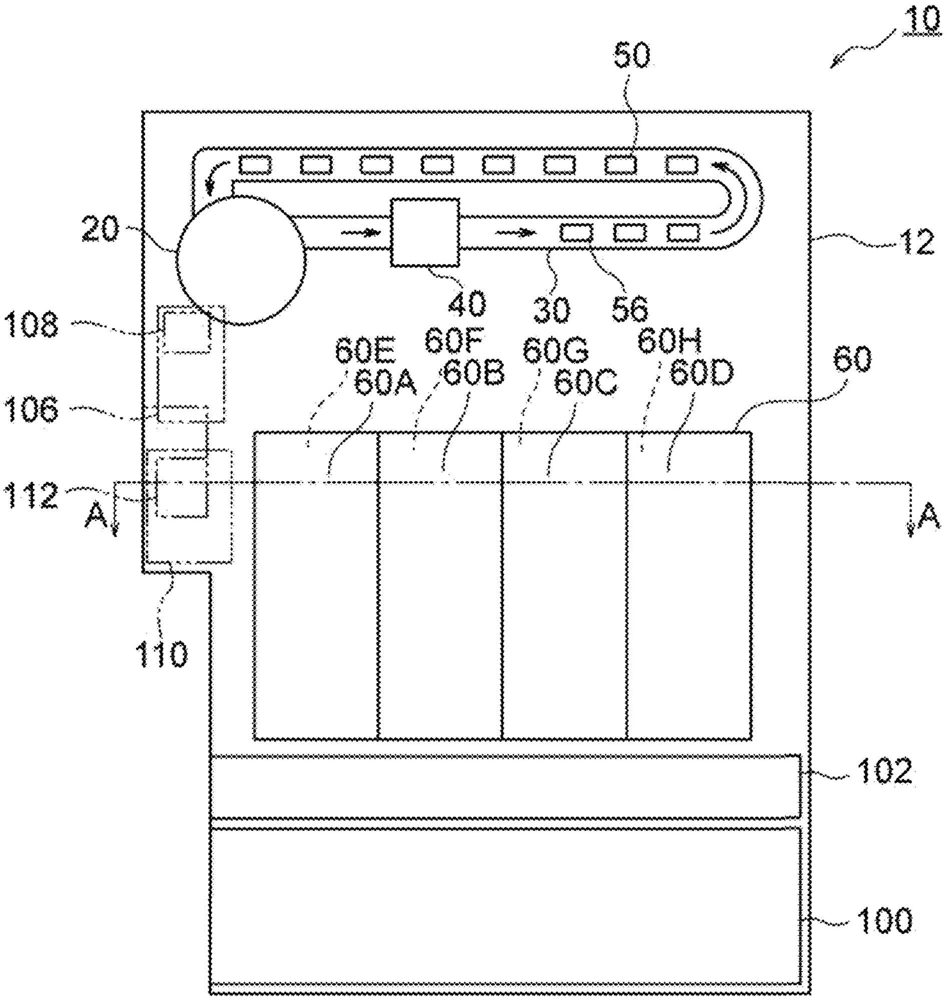
FIG. 1 is a schematic configuration diagram schematically illustrating an internal configuration of a coin depositing and dispensing machine according to an embodiment of the present invention.

In the coin feeding device disclosed in Japanese Laid-Open Patent Publication No. 2012-174035, in a case where a plurality of kinds of coins having diameters greatly different from each other are fed out, when the coin is caught by a protrusion of the rotary disk and moved upward, a plurality of coins having small diameters may be caught by one protrusion. In this case, a plurality of coins may be simultaneously fed out from the coin feeding device. The present invention has been made in view of such circumstances, and an object of the present invention is to provide a coin feeding device capable of feeding out coins one by one also in a case where a plurality of kinds of coins having diameters greatly different from each other are fed out.

An embodiment of the present invention will be described below with reference to the drawings. FIG. 1 to FIG. 14(*d*) illustrate a coin depositing and dispensing machine 10 according to the present embodiment. In FIG. 1 to FIG. 14(*d*), reference character C represents a coin to be handled. Reference characters C1 and C2 represent a coin having the smallest diameter and a coin having the largest diameter, respectively, among coins to be handled. The coin depositing and dispensing machine 10 according to the present embodiment performs coin depositing, coin dispensing, and the like.

The entire configuration of the coin depositing and dispensing machine 10 will be firstly described with reference to FIG. 1. As shown in FIG. 1, the coin depositing and dispensing machine 10 includes a feeding unit 20, a transport unit 30, a recognition unit 40, a sorting unit 50, a plurality of coin storage units 60, a collection box 100, and a storage drawer 102. Furthermore, the coin depositing and dispensing machine 10 has a substantially rectangular-parallelepiped-shaped housing 12. In the housing 12, the feeding unit 20, the transport unit 30, the recognition unit 40, the sorting unit 50, the plurality of coin storage units 60, the collection box 100, the storage drawer 102, and the like are disposed.

In FIG. 1, the surface on the left side of the housing 12 of the coin depositing and dispensing machine 10 is a front surface of the coin depositing and dispensing machine 10. In FIG. 1, the rightward direction is the depth direction of the coin depositing and dispensing machine 10.

Coins are inserted into the housing 12 from outside through a coin inlet (not shown) disposed at the upper surface of the housing 12, and stored in the feeding unit 20. The feeding unit 20 feeds out the stored coins one by one to the transport unit 30. The configuration of the feeding unit 20 having such a structure will be described below in detail.

Figure 3:
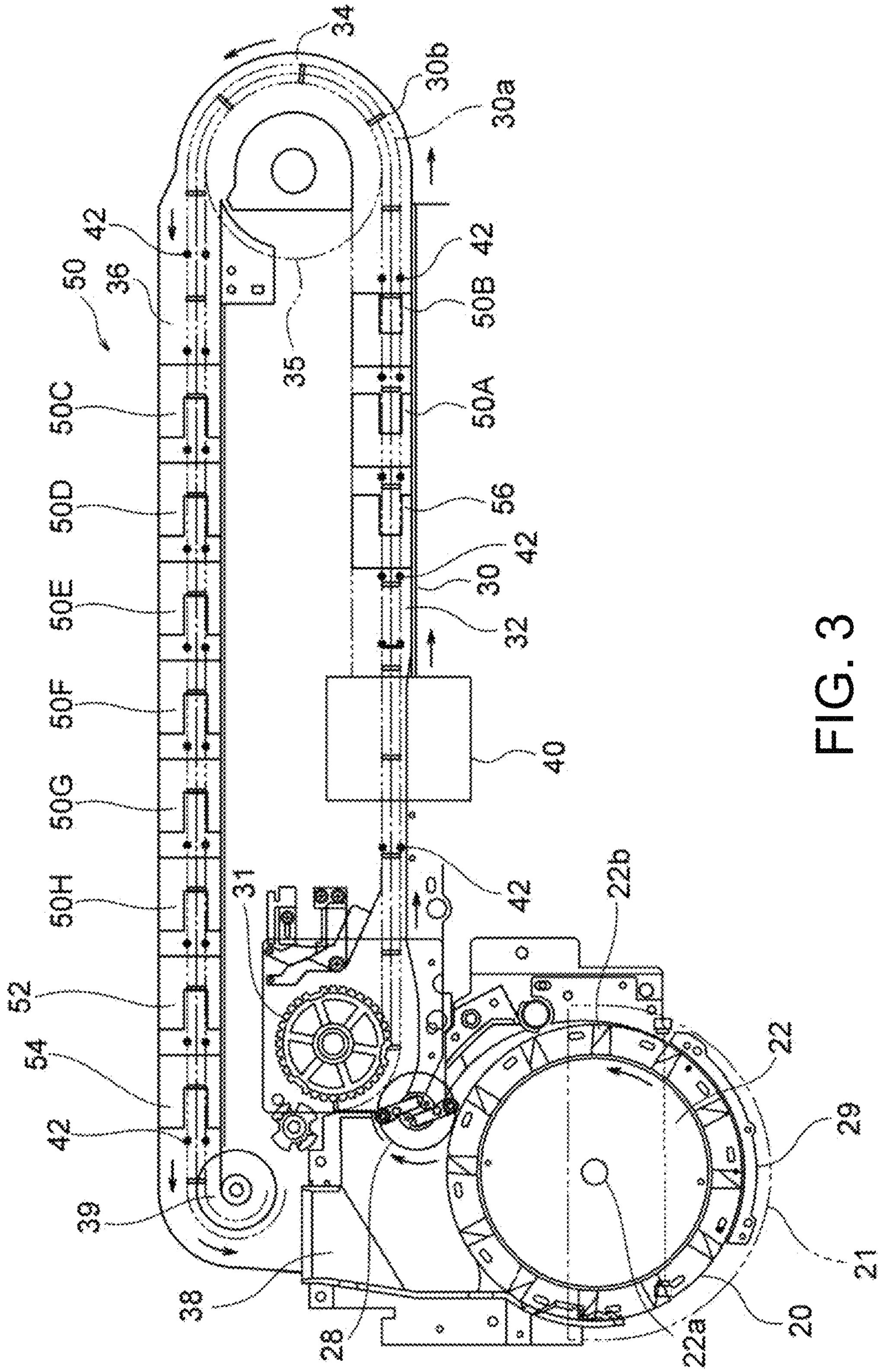

The transport unit 30 transports coins having been fed out from the feeding unit 20 one by one. The recognition unit 40 is disposed at the transport unit 30. The recognition unit 40 performs recognition of a denomination, authentication, fitness, a transport state, and the like of the coin transported by the transport unit 30. As shown in FIG. 3, a plurality of detectors 42 are disposed at the transport unit 30. Each of the detectors 42 detects a coin transported by the transport unit 30 when the coin passes through the detector 42. The configuration of the transport unit 30 having such a structure will be described below in detail.

A plurality (for example, eight) of the sorting units 50 are disposed at the transport unit 30. Each of the sorting units 50 sorts coins transported by the transport unit 30 based on coin recognition results from the recognition unit 40, and sends the sorted coins from the transport unit 30 to the coin storage unit 60. The configuration of the sorting unit 50 having such a structure will be described below in detail.

Figure 2:
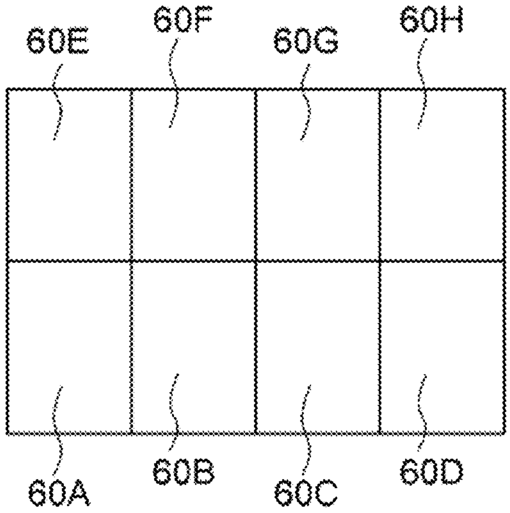
FIG. 2 is a configuration diagram illustrating a configuration of each coin storage unit of the coin depositing and dispensing machine shown in FIG. 1, as viewed from the direction of arrows A-A.

As shown in FIG. 1 and FIG. 2, a plurality (for example, eight) of the coin storage units 60 are disposed below the transport unit 30. The plurality of the sorting units 50 correspond to the plurality of the coin storage units 60 in a one-to-one manner. The coins transported by the transport unit 30 are sorted by the sorting unit 50, and the sorted coins are then sent to the coin storage unit 60 corresponding to the sorting unit 50.

Each of the coin storage units 60 stores the coins sent from the sorting unit 50, and feeds out the stored coins one by one. The fed coins may be sent to the storage drawer 102. The storage drawer 102 is drawable from the front surface side of the housing 12 to outside of the housing 12. The collection box 100 is disposed below the storage drawer 102. The collection box 100 is also drawable from the front surface side of the housing 12 to outside of the housing 12. The configuration of the coin storage unit 60 having such a structure will be described below in detail.

A dispensing transport unit may be disposed below each of the coin storage units 60 and above the storage drawer 102, and a coin dispensing unit to which coins are transported from the dispensing transport unit may be disposed. More specifically, the dispensing transport unit sends coins having been fed out from each of the coin storage units 60 to one of the coin dispensing unit or the storage drawer 102. The coin dispensing unit has a coin receptacle, and the coins sent from the dispensing transport unit to the coin dispensing unit are stacked in the coin receptacle. An operator is allowed to access the coin receptacle of the coin dispensing unit from outside of the housing 12. Thus, the operator is allowed to take out the to-be-dispensed coins which are stacked in the coin receptacle, to outside of the housing 12.

Furthermore, an overflow box 106, a counterfeit coin box 108, a foreign object return box 110, and a reject port 112 are disposed on the front surface side in the housing 12. The overflow box 106, the counterfeit coin box 108, and the foreign object return box 110 are drawable to outside of the housing 12. The operator is allowed to access the inside of the reject port 112 from outside of the housing 12. Therefore, the operator is allowed to take out coins having been sent to the reject port 112, to outside of the housing 12.

Figure 5:
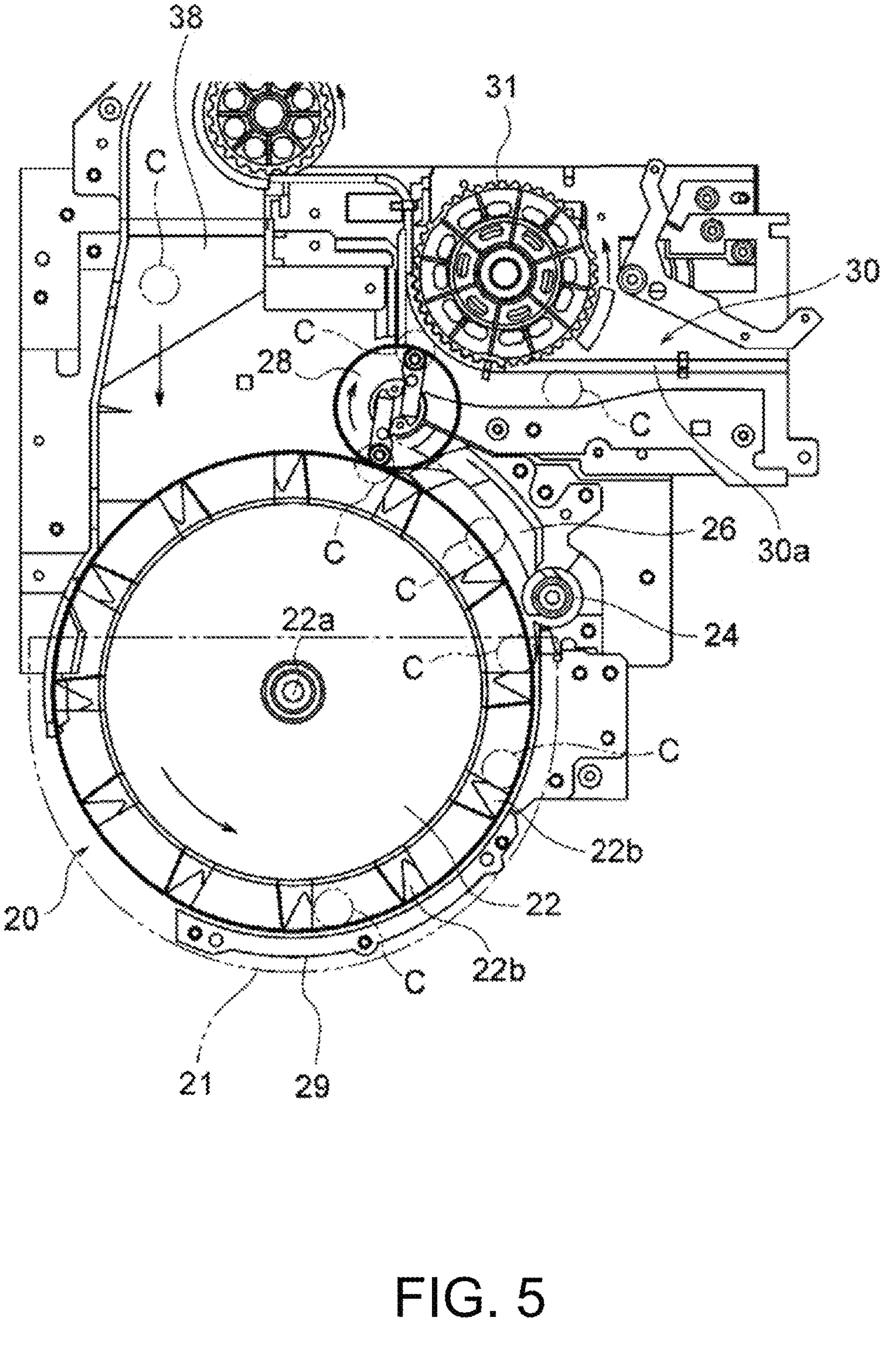
FIG. 5 is an enlarged configuration diagram illustrating a configuration of the feeding unit shown in FIG. 3 in an enlarged manner.

Next, configurations of the feeding unit 20, the transport unit 30, the recognition unit 40, each of the detectors 42, each of the sorting units 50, and the like will be described in detail with reference to, for example, FIG. 3 and FIG. 5. FIG. 3 is a configuration diagram illustrating in detail the configurations of the feeding unit 20, the transport unit 30, the sorting units 50, and the like of the coin depositing and dispensing machine 10 shown in FIG. 1 and the like. FIG. 5 is an enlarged configuration diagram illustrating the configuration of the feeding unit 20 shown in FIG. 3 in an enlarged manner.

As shown in FIG. 3 and FIG. 5, the feeding unit 20 has a disk 22 that rotates about a shaft 22*a*. The disk 22 has a plurality of protrusions 22*b* at the surface. The disk 22 is disposed so as to be rotatable in a tilted state. The disk 22 rotates counterclockwise in FIG. 3, whereby coins are caught by the protrusions 22*b* and thus moved upward. As shown in FIG. 3 and FIG. 5, the feeding unit 20 has a cover 21 that forms a space for storing coins, between the cover 21 and the surface of the disk 22.

As shown in FIG. 5, the feeding unit 20 has a separation cam 24 for separating, one by one, the coins that have been caught by the protrusions 22*b* and moved upward. A gap is formed between an outer peripheral edge of the disk 22 and the separation cam 24. In a case where the disk 22 rotates counterclockwise in FIG. 5 and a coin is caught by the protrusion 22*b* and is thus moved upward, a centrifugal force acts on the coin caught by the protrusion 22*b*, whereby the coin is moved toward the separation cam 24.

In a case where a plurality of coins each having a small diameter are simultaneously caught by the protrusion 22*b* and moved upward, the second and the subsequent coins collide with the separation cam 24 and are thus repelled by the separation cam 24. Thus, the second and the subsequent coins are separated from the protrusion 22*b* and thus fall down toward the lower portion of the feeding unit 20. In this manner, the coins that have been caught by the protrusion 22*b* and moved upward are separated one by one by the separation cam 24.

As shown in FIG. 5, the feeding unit 20 has a guide 26 for guiding the peripheral edge of a coin such that a part of the coin having been caught by the protrusion 22*b* and moved upward protrudes from the disk 22. A gap is formed between the guide 26 and the outer peripheral edge of the disk 22. The width dimension of the gap is less than a diameter of a coin having the smallest size. Thus, in a case where a coin is caught by the protrusion 22*b* and thus moved upward, a coin is inhibited from being inserted in the gap formed between the guide 26 and the outer peripheral edge of the disk 22.

In a case where the disk 22 rotates counterclockwise in FIG. 5 and a coin is caught by the protrusion 22*b* and thus moved upward, a centrifugal force acts on the coin caught by the protrusion 22*b*, and the coin is thus moved toward the guide 26. Thus, the coin caught by the protrusion 22*b* is moved upward while the peripheral edge of the coin is brought in contact with the guide 26.

The feeding unit 20 has a taking-out mechanism 28. The taking-out mechanism 28 grips only one coin that has been caught by each protrusion 22*b* and thus moved upward, removes the coin from the disk 22, and discharges the coin to outside of the disk 22. The coin discharged to outside of the disk 22 by the taking-out mechanism 28 is sent to the transport unit 30. Thus, coins are fed out one by one from the feeding unit 20 to the transport unit 30. The configuration of the taking-out mechanism 28 having such a structure will be described in detail with reference to FIG. 6 to FIG. 12.

Figure 6:
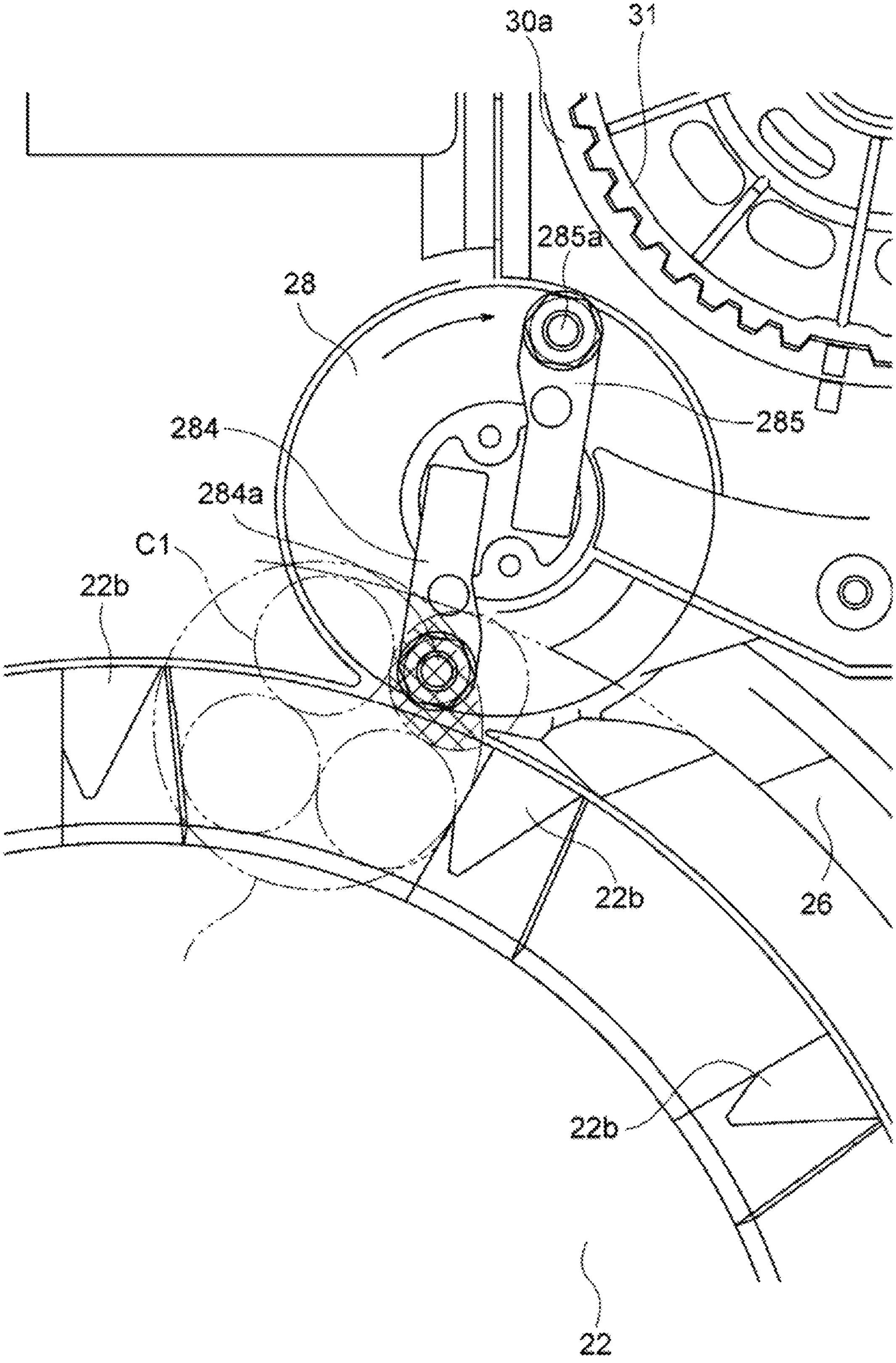
FIG. 6 is an enlarged configuration diagram illustrating a taking-out mechanism, shown in FIG. 5 of the feeding unit in a further enlarged manner.
Figure 7:
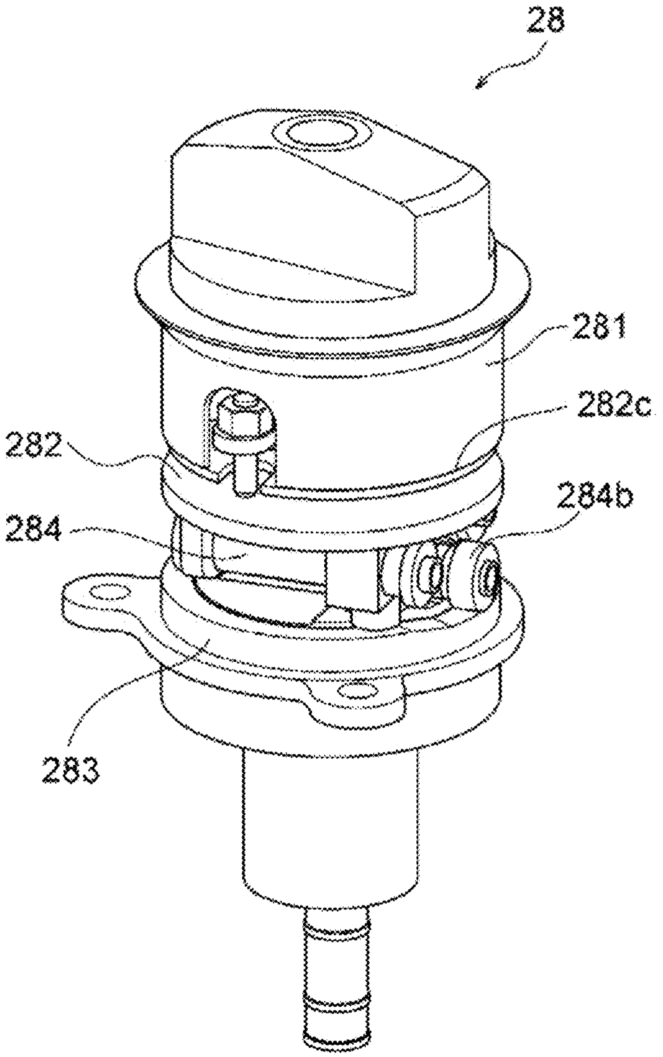
FIG. 7 is a perspective view of the taking-out mechanism shown in FIG. 6.
Figure 8:
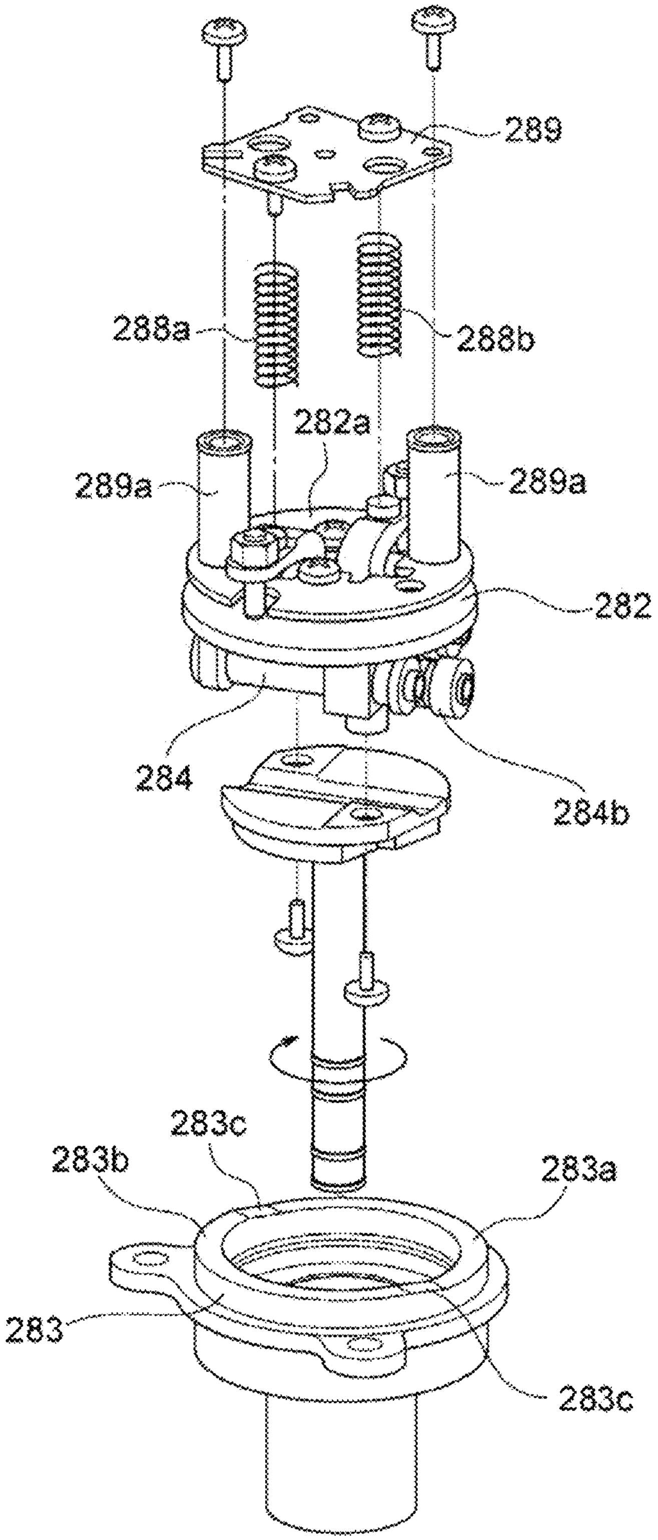
FIG. 8 is an exploded perspective view of the taking-out mechanism shown in FIG. 7.
Figure 9:
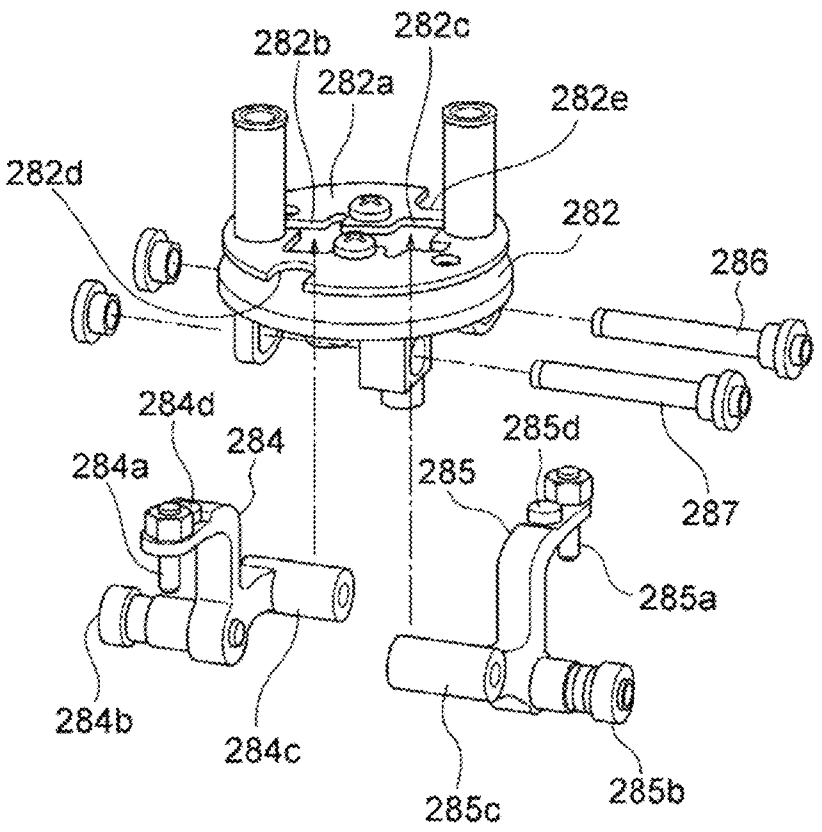

FIG. 6 is an enlarged configuration diagram illustrating the taking-out mechanism 28, shown in FIG. 5, of the feeding unit 20 in a further enlarged manner. FIG. 7 is a perspective view of the taking-out mechanism 28 shown in FIG. 6. FIG. 8 is an exploded perspective view of the taking-out mechanism 28 shown in FIG. 7. FIG. 9 is an exploded perspective view of a body portion 282, a first gripping member 284, and a second gripping member 285 of the taking-out mechanism 28 shown in FIG. 6 and the like.

Figure 10:
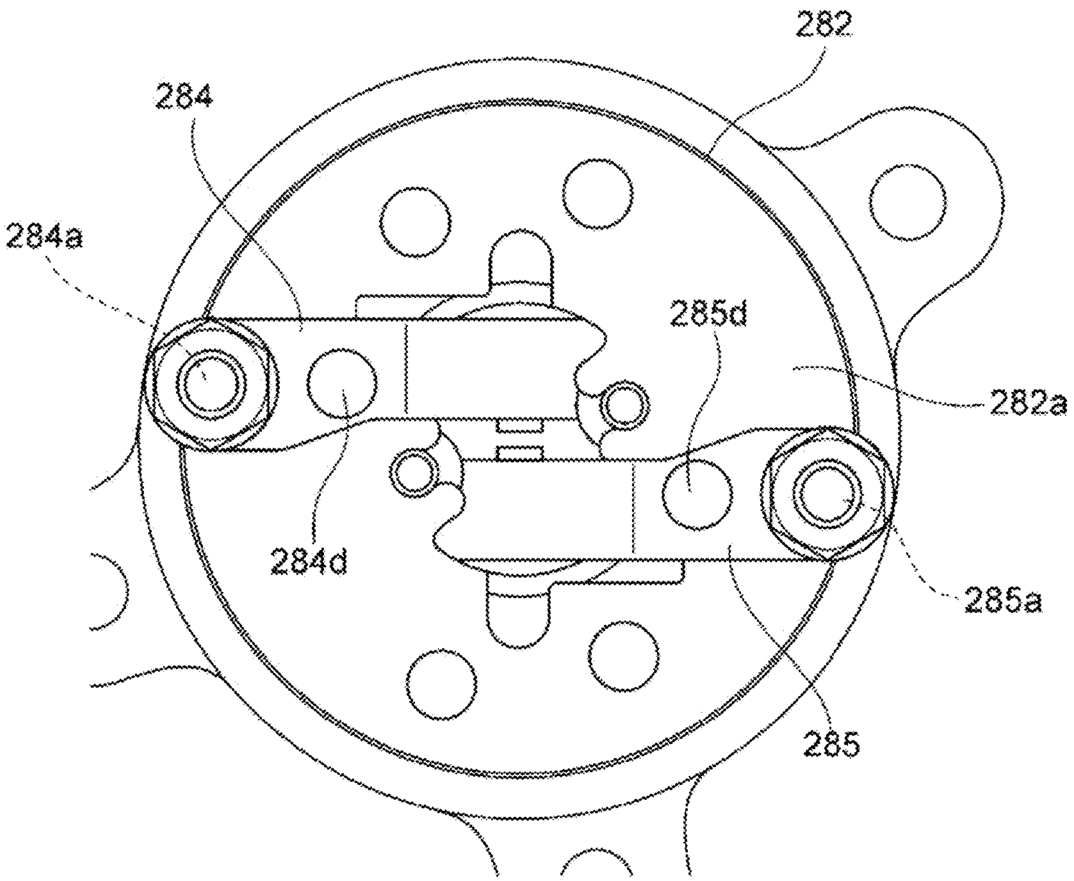
Figure 11:
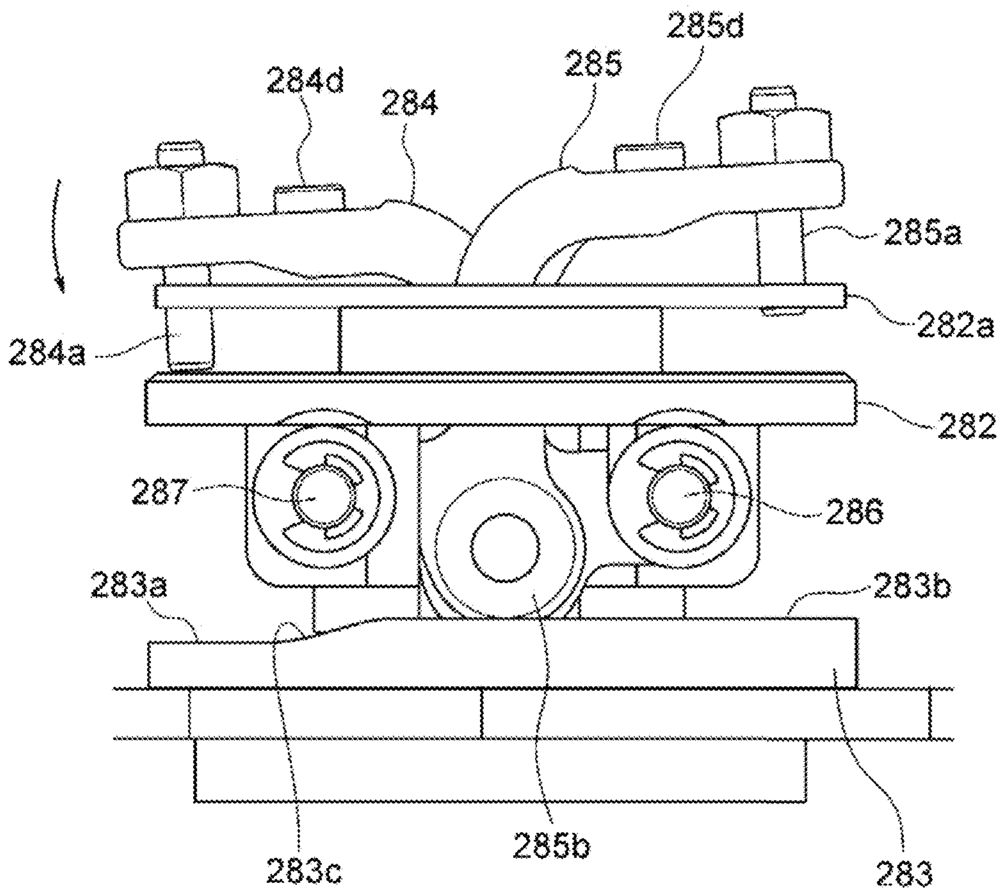
FIG. 11 is a side view of the body portion, the first gripping member, and the second gripping member shown in FIG. 10 as viewed from the lower side in the upward direction.
Figure 12:
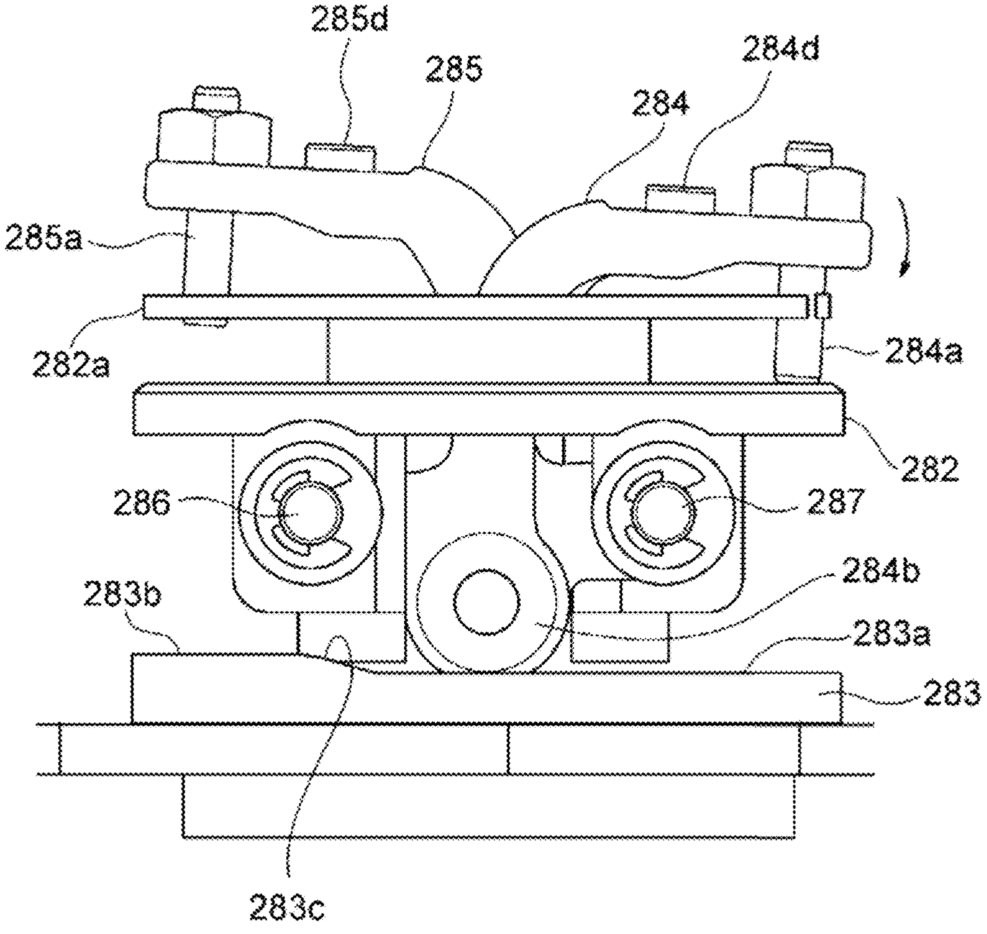
FIG. 12 is a side view of the body portion, the first gripping member, and the second gripping member shown in FIG. 10 as viewed from the upper side in the downward direction.

FIG. 10 is a top view of the body portion 282, the first gripping member 284, and the second gripping member 285 of the taking-out mechanism 28 shown in FIG. 6 and the like. FIG. 11 is a side view of the body portion 282, the first gripping member 284, and the second gripping member 285 shown in FIG. 10 as viewed from the lower side in the upward direction of FIG. 10. FIG. 12 is a side view of the body portion 282, the first gripping member 284, and the second gripping member 285 shown in FIG. 10 as viewed from the upper side in the downward direction of FIG. 10.

As shown in FIG. 7 to FIG. 9, the taking-out mechanism 28 has a cover 281, the body portion 282, a cam 283, the first gripping member 284, the second gripping member 285, a first mounting member 286, a second mounting member 287, two compression springs 288*a*, 288*b*, and a spring support plate 289.

The body portion 282 is substantially disk-shaped, and the first gripping member 284 and the second gripping member 285 are mounted to the lower surface of the body portion 282. Specifically, the first gripping member 284 is mounted to the lower surface of the body portion 282 by the first mounting member 286 having an elongated columnar shape. The second gripping member 285 is mounted to the lower surface of the body portion 282 by the second mounting member 287 having an elongated columnar shape. As shown in FIG. 6 and the like, the first gripping member 284 and the second gripping member 285 are disposed so as to be symmetric about the center of the taking-out mechanism 28.

A substantially disk-shaped upper face member 282*a* is mounted at the upper portion of the body portion 282. A gap having a size greater than the thickness of one coin is formed between the body portion 282 and the upper face member 282*a*. The upper face member 282*a* has a first hole 282*b* through which the first gripping member 284 penetrates and a second hole 282*c* through which the second gripping member 285 penetrates.

The first gripping member 284 has a contact pin 284*a*, a roller 284*b*, a cylindrical member 284*c*, and a spring mounting portion 284*d*. The contact pin 284*a* comes into contact with a coin in order to grip the coin at one point between the contact pin 284*a* and the upper face of the body portion 282. Specifically, as shown in FIG. 6, the contact pin 284*a* is disposed near the outer peripheral edge of the taking-out mechanism 28. The upper face member 282*a* has a cut portion 282*d* for allowing the contact pin 284*a* to pass therethrough.

The roller 284*b* rolls on the upper face of the cam 283 described below. As the first mounting member 286 having the elongated columnar shape passes through a through hole of the cylindrical member 284*c*, the first gripping member 284 is mounted to the body portion 282 by the first mounting member 286. Thus, the first gripping member 284 oscillates relative to the body portion 282 about the axis of the first mounting member 286. The lower end portion of the compression spring 288*a* described below is mounted to the spring mounting portion 284*d*.

As shown in FIG. 10 to FIG. 12, the first gripping member 284 penetrates through the first hole 282*b* of the upper face member 282*a*. Thus, the spring mounting portion 284*d* is disposed above the upper face member 282*a*. Meanwhile, the roller 284*b* and the cylindrical member 284*c* are disposed below the upper face member 282*a*. The contact pin 284*a* extends from a position above the upper face member 282*a* through the cut portion 282*d* to a portion below the upper face member 282*a*.

The second gripping member 285 has a contact pin 285*a*, a roller 285*b*, a cylindrical member 285*c*, and a spring mounting portion 285*d*. The contact pin 285*a* comes into contact with a coin in order to grip the coin at one point between the contact pin 285*a* and the upper face of the body portion 282. Specifically, as shown in FIG. 6, the contact pin 285*a* is disposed near the outer peripheral edge of the taking-out mechanism 28. The contact pin 284*a* of the first gripping member 284 and the contact pin 285*a* of the second gripping member 285 are disposed so as to be symmetric about the center of the taking-out mechanism 28. The upper face member 282*a* has a cut portion 282*e* for allowing the contact pin 285*a* to pass therethrough.

The roller 285*b* rolls on the upper face of the cam 283 described below. As the second mounting member 287 having the elongated columnar shape passes through a through hole of the cylindrical member 285*c*, the second gripping member 285 is mounted to the body portion 282 by the second mounting member 287. Thus, the second gripping member 285 oscillates relative to the body portion 282 about the axis of the second mounting member 287. The lower end portion of the compression spring 288*b* described below is mounted to the spring mounting portion 285*d*.

As shown in FIG. 10 to FIG. 12, the second gripping member 285 penetrates through the second hole 282*c* of the upper face member 282*a*. Thus, the spring mounting portion 285*d* is disposed above the upper face member 282*a*. Meanwhile, the roller 285*b* and the cylindrical member 285*c* are disposed below the upper face member 282*a*. The contact pin 285*a* extends from a position above the upper face member 282*a* through the cut portion 282*e* to a portion below the upper face member 282*a*.

As shown in FIG. 8, the cam 283 has a first upper face 283*a*, a second upper face 283*b*, and tilted upper faces 283*c* that connect between the first upper face 283*a* and the second upper face 283*b*. The first upper face 283*a* and the second upper face 283*b* are disposed so as to be symmetric about the center of the taking-out mechanism 28. More specifically, the first upper face 283*a* of the cam 283 is disposed near the outer peripheral edge of the disk 22. The second upper face 283*b* of the cam 283 is disposed apart from the outer peripheral edge of the disk 22.

The first upper face 283*a* and the second upper face 283*b* are stepped relative to each other, and the second upper face 283*b* is disposed at a higher position than the first upper face 283*a*. The tilted upper faces 283*c* are disposed at stepped portions between the first upper face 283*a* and the second upper face 283*b*.

The cam 283 is disposed so as to be fixed. Meanwhile, the body portion 282, the upper face member 282*a*, the cover 281, and the like rotate about the axis parallel to the shaft 22*a* (rotation axis) of the disk 22. Specifically, the body portion 282 and the like rotate clockwise (in a direction indicated by an arrow in FIG. 8) relative to the cam 283. At this time, the first gripping member 284 and the second gripping member 285 approach the disk 22 in synchronization with approaching of the protrusion 22*b*.

When the body portion 282 and the like rotate relative to the cam 283, the roller 284*b* of the first gripping member 284 and the roller 285*b* of the second gripping member 285 move while smoothly rolling on the first upper face 283*a*, the second upper face 283*b*, and the tilted upper faces 283*c*.

The spring support plate 289 is mounted to the upper face member 282*a* by a pair of support members 289*a*. The two compression springs 288*a*, 288*b* are mounted, in contracted states, to the lower face of the spring support plate 289. The upper end portion of the one compression spring 288*a* is mounted to the lower face of the spring support plate 289 and the lower end portion of the compression spring 288*a* is mounted to the spring mounting portion 284*d* of the first gripping member 284. The upper end portion of the other compression spring 288*b* is mounted to the lower face of the spring support plate 289, and the lower end portion of the compression spring 288*b* is mounted to the spring mounting portion 285*d* of the second gripping member 285.

In FIG. 9, the compression spring 288*a* presses the spring mounting portion 284*d* downward so as to rotate the first gripping member 284 downward about the axis of the first mounting member 286 by a force for restoring the compression spring 288*a* from a contracted state to a neutral state. Thus, a force for downward movement acts on the contact pin 284*a*. The compression spring 288*b* presses the spring mounting portion 285*d* downward so as to rotate the second gripping member 285 downward about the axis of the second mounting member 287 by a force for restoring the compression spring 288*b* from a contracted state to a neutral state. Thus, a force for downward movement acts on the contact pin 285*a*.

As shown in FIG. 7, the cover 281 is disposed so as to cover the upper portion of the upper face member 282*a*, whereby the spring support plate 289, the pair of support members 289*a*, the pair of compression springs 288*a*, 288*b*, and the like are stored in the cover 281.

In the taking-out mechanism 28 having such a structure, as shown in FIG. 12, in a case where the roller 284*b* of the first gripping member 284 is located on the first upper face 283*a* of the cam 283, the compression spring 288*a* presses the spring mounting portion 284*d* downward, whereby the first gripping member 284 rotates clockwise in FIG. 12 about the axis of the first mounting member 286. Thus, the contact pin 284*a* of the first gripping member 284 is also moved downward. Therefore, in a case where a coin is located between the contact pin 284*a* which has not been moved downward yet, and the upper face of the body portion 282, the coin is gripped between the contact pin 284*a* and the upper face of the body portion 282 by the contact pin 284*a*.

As described above, the first upper face 283*a* and the second upper face 283*b* are disposed so as to be symmetric about the center of the taking-out mechanism 28. Furthermore, the contact pin 284*a* of the first gripping member 284 and the contact pin 285*a* of the second gripping member 285 are disposed so as to be symmetric about the center of the taking-out mechanism 28. Therefore, as shown in FIG. 11, in a case where the roller 284*b* of the first gripping member 284 is located on the first upper face 283*a* of the cam 283, the roller 285*b* of the second gripping member 285 is located on the second upper face 283*b* of the cam 283.

Also in this case, the compression spring 288*b* presses the spring mounting portion 285*d* downward, whereby the second gripping member 285 rotates clockwise in FIG. 11 about the axis of the second mounting member 287. However, since the second upper face 283*b* of the cam 283 is disposed at a higher position than the first upper face 283*a*, the contact pin 285*a* of the second gripping member 285 does not move downward from a position shown in FIG. 11 by contact of the roller 285*b* with the second upper face 283*b*. Therefore, a gap is formed between the lower end portion of the contact pin 285*a* and the upper face of the body portion 282, and a coin is not gripped by the contact pin 285*a*.

Although not shown, in a case where the roller 284*b* of the first gripping member 284 is located on the second upper face 283*b* of the cam 283, a gap is formed between the lower end portion of the contact pin 284*a* and the upper face of the body portion 282, and a coin is not gripped by the contact pin 284*a*. In this case, since the roller 285*b* of the second gripping member 285 is located on the first upper face 283*a* of the cam 283, the contact pin 285*a* of the second gripping member 285 is moved downward. Therefore, in a case where a coin is located between the contact pin 285*a* that has not been moved downward yet, and the upper face of the body portion 282, the coin is gripped between the contact pin 285*a* and the upper face of the body portion 282 by the contact pin 285*a*.

The first upper face 283*a* of the cam 283 is disposed near the outer peripheral edge of the disk 22. The second upper face 283*b* of the cam 283 is disposed apart from the outer peripheral edge of the disk 22. Therefore, in a case where the first gripping member 284 or the second gripping member 285 approaches the outer peripheral edge of the disk 22 by rotating the body portion 282 and the like relative to the cam 283, the roller 284*b* of the first gripping member 284 or the roller 285*b* of the second gripping member 285 is located on the first upper face 283*a* of the cam 283. Thus, the coin that has been caught by each of the protrusions 22*b* and thus moved upward is gripped by the contact pin 284*a* of the first gripping member 284 or the contact pin 285*a* of the second gripping member 285.

When, in a state where the coin is gripped by the contact pin 284*a* of the first gripping member 284 or the contact pin 285*a* of the second gripping member 285, the first gripping member 284 or the second gripping member 285 is moved away from the outer peripheral edge of the disk 22 and approaches a pulley 31 of the transport unit 30, the roller 284*b* of the first gripping member 284 or the roller 285*b* of the second gripping member 285 is located on the second upper face 283*b* of the cam 283. Therefore, the contact pin 284*a* of the first gripping member 284 or the contact pin 285*a* of the second gripping member 285 is separated from the upper face of the body portion 282. Thus, the coin is released from the contact pin 284*a* of the first gripping member 284 or the contact pin 285*a* of the second gripping member 285, and the released coin is delivered to the transport unit 30.

In the present embodiment, as shown in FIG. 6, in a range (that is, a mesh-pattern region in FIG. 6) in which a coin having a large diameter and a coin having a small diameter as caught by the protrusion 22*b* can overlap, the contact pin 284*a* of the first gripping member 284 and the contact pin 285*a* of the second gripping member 285 approach the body portion 282 to grip the coin at one point. Therefore, regardless of the size of a diameter of a coin caught by the protrusion 22*b*, the coin can be gripped at one point by the contact pin 284*a*, 285*a*.

An operation of the taking-out mechanism 28 having such a structure will be described below in detail.

The feeding unit 20 has a remaining coin detection sensor (not shown) for detecting coins stored in the feeding unit 20.

When a foreign object removal gate 29 disposed at the bottom of the feeding unit 20 is opened, a foreign object such as a clip stored in the feeding unit 20 falls down due to its own weight from the feeding unit 20 to the foreign object return box 110, and is stored in the foreign object return box 110. The operator is allowed to take out the foreign object stored in the foreign object return box 110 by drawing the foreign object return box 110 from the housing 12 to outside.

The transport unit 30 has a first transport path 32, a second transport path 36 disposed above the first transport path 32, and a turning back portion 34 which changes a direction of transportation of a coin transported by the first transport path 32 by 180°, and sends the coin to the second transport path 36. The coin fed out from the feeding unit 20 to the transport unit 30 is firstly transported rightward in FIG. 3 along the first transport path 32, and, subsequently, the direction of the transportation is changed by 180° by the turning back portion 34.

The coin sent from the turning back portion 34 to the second transport path 36 is transported leftward in FIG. 3 along the second transport path 36. A guiding unit 38 for guiding the coin from the second transport path 36 to the feeding unit 20 is disposed at the downstream-side end of the second transport path 36. In a case where a coin is sent from the second transport path 36 to the guiding unit 38, the coin is returned to the upper position of the disk 22 of the feeding unit 20 by the guiding unit 38.

The transport unit 30 has an endless belt 30*a*. In the belt 30*a*, a plurality of protrusions 30*b* are disposed at regular intervals. The belt 30*a* is extended over a plurality of pulleys 31, 39 and the like, and a pulley among the plurality of pulleys 31, 39 and the like is rotated by a motor, whereby the belt 30*a* circulates counterclockwise in FIG. 3. Thus, the coin fed out from the feeding unit 20 to the transport unit 30 is caught by the protrusion 30*b* and thus transported one by one.

The recognition unit 40 and the plurality of detectors 42 are disposed at a coin transport path in the transport unit 30. The recognition unit 40 is configured by, for example, a combination of a line sensor and a magnetic sensor. The recognition unit 40 performs recognition of a denomination, authentication, fitness, a transport state, and the like of the coin transported by the transport unit 30.

Each of the detectors 42 is implemented by an optical sensor including a light-emitting element and a light-receiving element between which the coin transport path is disposed. When a coin transported by the belt 30*a* passes through each of the detectors 42 in the transport unit 30, light emitted from the light-emitting element is blocked by the coin and is not received by the light-receiving element, whereby the detector 42 detects the coin. According to the coin detection result from the detector 42 having such a structure, abnormality in transporting (for example, chaining or overlapping) of each coin can also be detected.

A reject unit 56 is disposed downstream of the recognition unit 40 in the direction in which the coin is transported by the belt 30*a*. The reject unit 56 sorts coins (for example, resin coins formed of resin) that have been detected by the detector 42 disposed upstream of the recognition unit 40 but cannot be recognized by the recognition unit 40, and sends the sorted coins from the transport unit 30 to the reject port 112. As described above, the operator is allowed to take out the coins having been sent to the reject port 112 from the housing 12 to outside.

A plurality of the sorting units 50 are disposed downstream of the reject unit 56 in the direction in which the coin is transported by the belt 30*a*. The plurality of the sorting units 50 include a first sorting unit 50A, a second sorting unit 50B, a third sorting unit 50C, a fourth sorting unit 50D, a fifth sorting unit 50E, a sixth sorting unit 50F, a seventh sorting unit 50G, and an eighth sorting unit 50H.

The sorting units 50 are disposed so as to correspond to the coin storage units 60 in a one-to-one manner. A denomination is assigned to each of the coin storage units 60. Each of the sorting units 50 sorts coins of the denomination assigned to the corresponding coin storage unit 60, based on the coin recognition result from the recognition unit 40, and sends the sorted coins from the transport unit 30 to the corresponding coin storage unit 60.

An overflow sorting unit 52 and a counterfeit coin sorting unit 54 are disposed downstream of the sorting units 50 in the direction in which the coin is transported by the belt 30*a*. In a case where the coin storage unit 60 corresponding to a denomination of the coin recognized by the recognition unit 40 is in a full state or a nearly full state, and coins cannot be further stored in the coin storage unit 60, the coins are not sorted by the sorting unit 50 corresponding to the coin storage unit 60. In this case, the coins are sorted by the overflow sorting unit 52 and sent from the transport unit 30 to the overflow box 106.

A coin recognized as a counterfeit coin by the recognition unit 40 is sorted by the counterfeit coin sorting unit 54 and sent from the transport unit 30 to the counterfeit coin box 108. The operator is allowed to take out the coins stored in the overflow box 106 and the coins stored as the counterfeit coins in the counterfeit coin box 108 by drawing the overflow box 106 and the counterfeit coin box 108 from the housing 12 to outside.

The plurality of the coin storage units 60 are disposed below the transport unit 30. The plurality of the coin storage units 60 include a first coin storage unit 60A, a second coin storage unit 60B, a third coin storage unit 60C, a fourth coin storage unit 60D, a fifth coin storage unit 60E, a sixth coin storage unit 60F, a seventh coin storage unit 60G, and an eighth coin storage unit 60H.

As described above, each of the coin storage units 60 stores coins sorted by the corresponding sorting unit 50 from the transport unit 30. Each of the coin storage units 60 can feed out the stored coins one by one, and send the coins to the storage drawer 102 or the collection box 100. A denomination of coins to be stored is assigned to each of the coin storage units 60. Thus, each of the coin storage units 60 stores the coins based on the denomination.

In the coin dispensing, coins fed out from each of the coin storage units 60 are sent to the storage drawer 102, and stored in the storage drawer 102. After the coin dispensing has been completed, the operator is allowed to take out the coins to be dispensed, from the storage drawer 102, by drawing the storage drawer 102 through the front surface of the housing 12 to the front side.

In the coin collection, in a case where the collection box 100 is mounted in the housing 12 but the storage drawer 102 is not mounted in the housing 12, the coins fed out from each of the coin storage units 60 are sent to the collection box 100, and stored in the collection box 100. After the coin collection has been completed, the operator is allowed to collect the coins together with the collection box 100 by drawing the collection box 100 through the front surface of the housing 12 to the front side.

Figure 4:
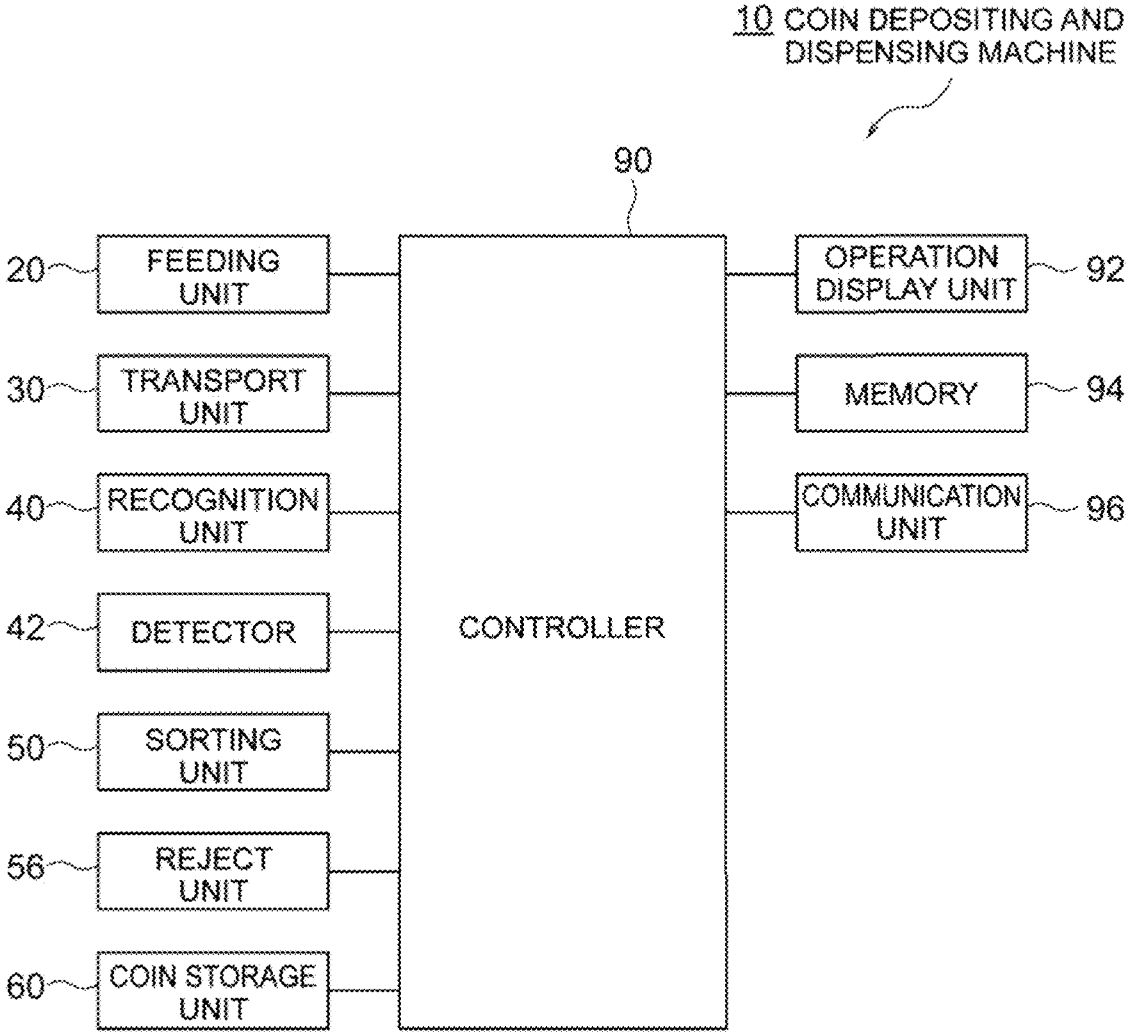

As shown in FIG. 4, a controller 90 such as a CPU (central processing unit) is disposed in the housing 12 of the coin depositing and dispensing machine 10. To the controller 90, components such as the feeding unit 20, the transport unit 30, the recognition unit 40, each of the detectors 42, each of the sorting units 50, the reject unit 56, and each of the coin storage units 60 are connected. The coin recognition result from the recognition unit 40 and the coin detection result from each of the detectors 42 are transmitted to the controller 90. The controller 90 controls the components by transmitting an instruction signal to each component of the coin depositing and dispensing machine 10.

As shown in FIG. 4, an operation display unit 92, a memory 94, and a communication unit 96 are connected to the controller 90. The operation display unit 92 is implemented by, for example, a touch panel disposed at the front surface or the top surface of the housing 12. Information of, for example, the coin handling state in the coin depositing and dispensing machine 10 and an inventory amount of coins stored in each of the coin storage units 60 is displayed on the operation display unit 92. The operator is allowed to input various instructions to the controller 90 through the operation display unit 92.

The memory 94 is implemented by an HDD (hard disk drive), a RAM (random access memory), a ROM (read only memory), an SSD (solid state drive), or the like. Information of, for example, a coin handling history in the coin depositing and dispensing machine 10 and an inventory amount of coins stored in each of the coin storage units 60 is stored in the memory 94.

The operation display unit 92 or the memory 94 may not necessarily be disposed in the coin depositing and dispensing machine 10 but may be disposed outside the coin depositing and dispensing machine 10. In this case, the controller 90 may transmit and receive a signal to and from the operation display unit 92 or the memory 94 disposed outside the coin depositing and dispensing machine 10 through the communication unit 96.

The controller 90 can transmit and receive various signals to and from a device other than the coin depositing and dispensing machine 10 through the communication unit 96. For example, the controller 90 transmits information of, for example, a coin handling state in the coin depositing and dispensing machine 10 or an inventory amount of coins stored in each of the coin storage units 60, to a higher-ranking terminal such as a POS register, through the communication unit 96. Furthermore, an instruction for starting coin depositing or an instruction for starting coin dispensing may be transmitted to the controller 90 from the higher-ranking terminal such as a POS register through the communication unit 96.

Next, a coin handling method performed by the coin depositing and dispensing machine 10 of the present embodiment will be described. The controller 90 controls the components of the coin depositing and dispensing machine 10, whereby the following operations are performed.

Firstly, the coin depositing performed by the coin depositing and dispensing machine 10 will be described. Coins are inserted into the housing 12 through the coin inlet disposed at the upper face of the housing 12 from outside of the housing 12, and the inserted coins are then stored in the feeding unit 20.

When the coins have been stored in the feeding unit 20 and detected by the remaining coin detection sensor, the disk 22 of the feeding unit 20 rotates about the shaft 22*a* in the direction indicated by the arrow in FIG. 3, and the belt 30*a* of the transport unit 30 circulates in the direction indicated by the arrow in FIG. 3. The taking-out mechanism 28 of the feeding unit 20 also rotates in the direction indicated by the arrow in FIG. 3. Thus, the coins are fed out one by one from the feeding unit 20 to the transport unit 30. The taking-out mechanism 28 rotates in the direction opposite to the direction of rotation of the disk 22.

More specifically, the disk 22 rotates counterclockwise in FIG. 5, and the coin is caught by the protrusion 22*b* and thus moved upward, whereby a centrifugal force acts on the coin caught by the protrusion 22*b* and the coin is thus moved toward the separation cam 24. In a case where a plurality of coins each having a small diameter are simultaneously caught by the protrusion 22*b* and moved upward, the second and the subsequent coins collide with the separation cam 24 and are thus repelled by the separation cam 24. Thus, the second and the subsequent coins are separated from the protrusion 22*b* and thus fall down toward the lower portion of the feeding unit 20. Thus, the coins that have been caught by the protrusion 22*b* and moved upward are separated one by one by the separation cam 24.

The coin caught by the protrusion 22*b* is further moved upward, and the coin is moved toward the guide 26 by a centrifugal force. Thus, the coin caught by the protrusion 22*b* is moved upward while the peripheral edge of the coin is in contact with the guide 26. At this time, as shown in FIG. 5, a part of the coin protrudes outward from the outer peripheral edge of the disk 22.

In a case where the coin is further moved upward while the peripheral edge of the coin is in contact with the guide 26, the coin protruding from the disk 22 is gripped by the taking-out mechanism 28, whereby the coin is removed from the disk 22 and discharged to outside of the disk 22. Such an operation will be described with reference to FIG. 13 and FIGS. 14(*a*) to 14(*d*).

Figure 13:
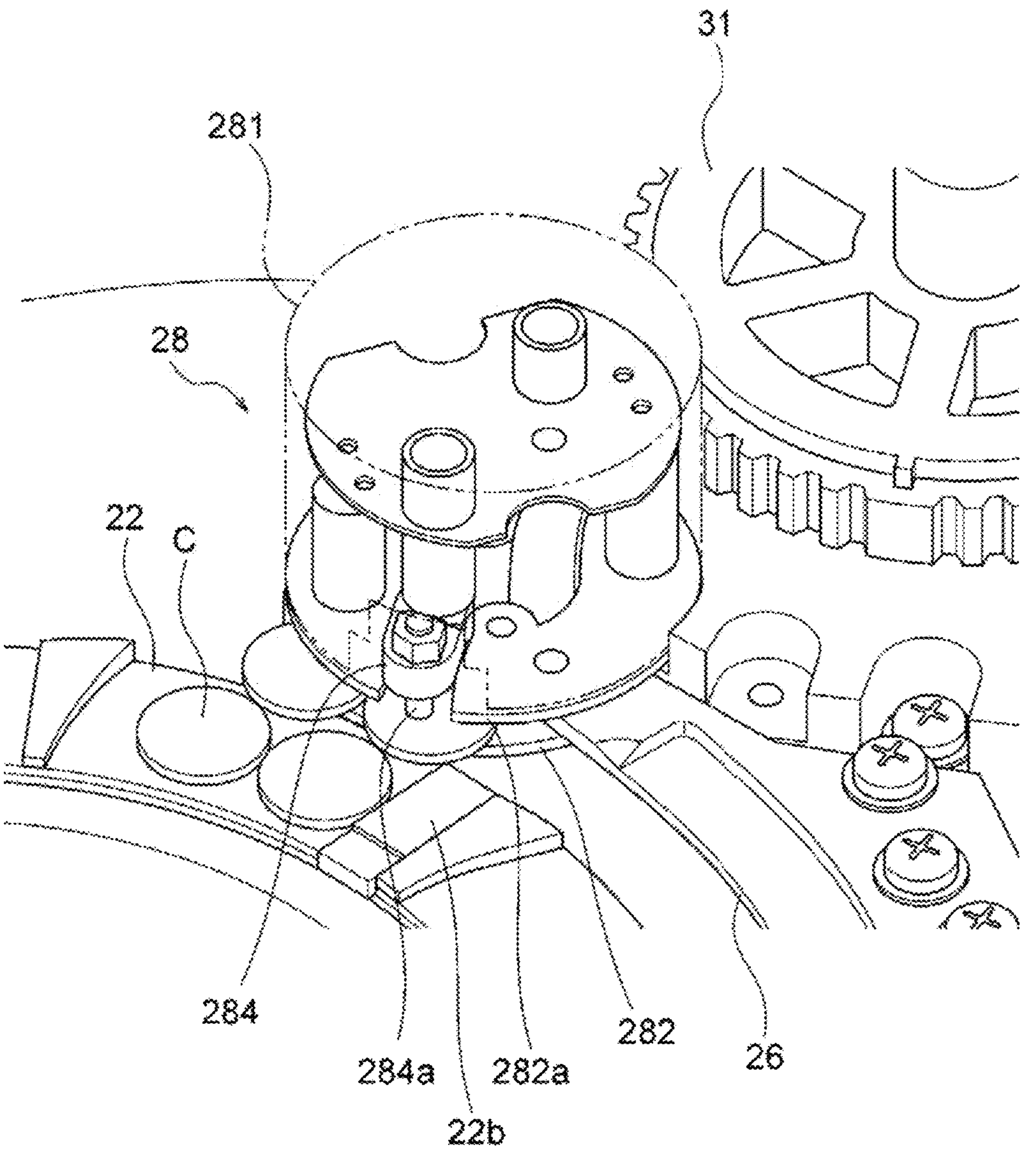
FIG. 13 is a perspective view showing an operation in which a coin caught by a protrusion of a disk of the feeding unit shown in FIG. 5 and the like is gripped and removed from the disk by the taking-out mechanism.
Figure 14A:
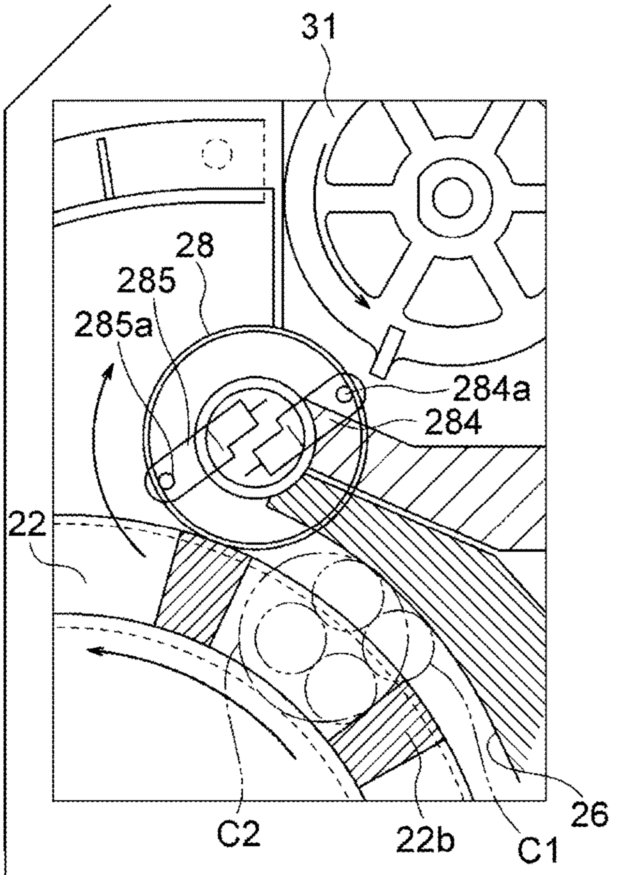
FIGS. 14(*a*) to 14(*d*) sequentially illustrate the operation in which the coin caught by the protrusion of the disk of the feeding unit shown in FIG. 5 and the like is gripped and removed from the disk by the taking-out mechanism.
Figure 14B:
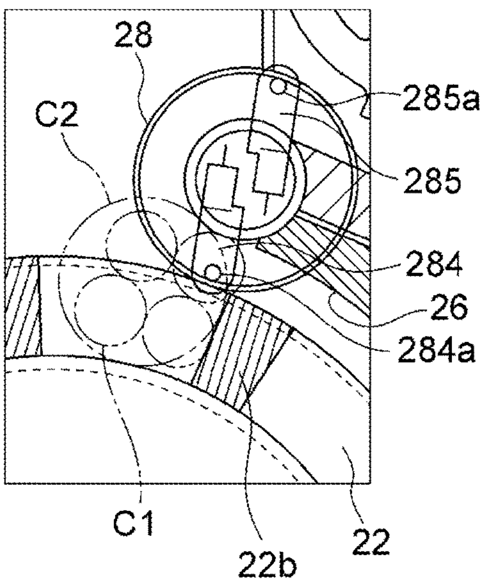
Figure 14C:
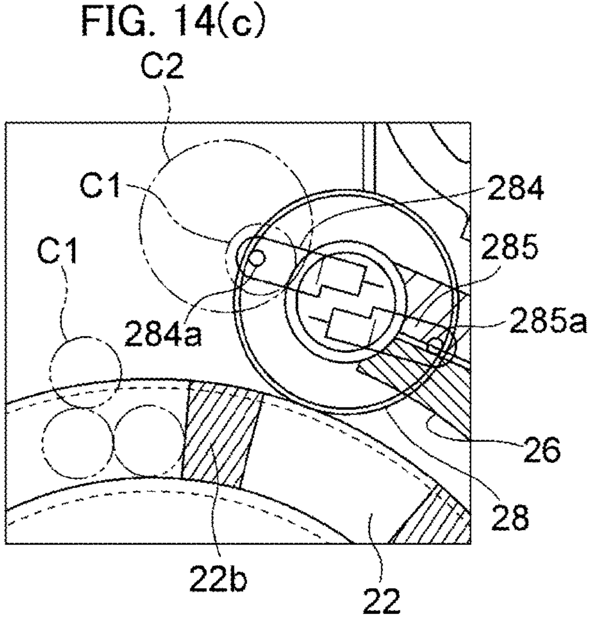
Figure 14D:
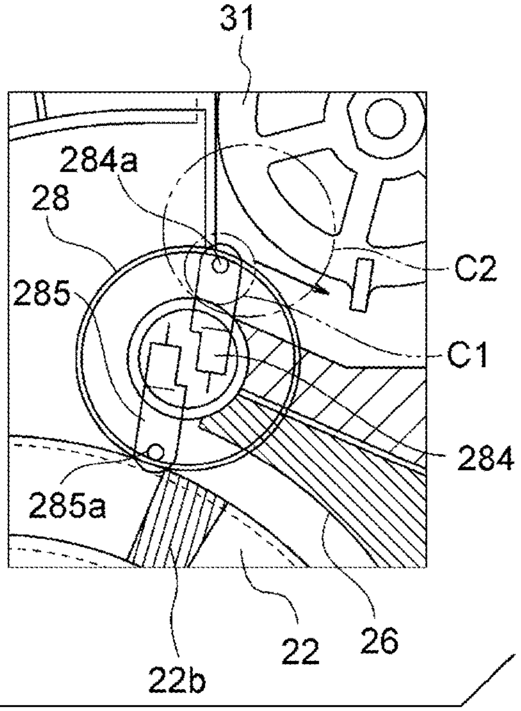

FIG. 13 is a perspective view showing an operation in which a coin caught by the protrusion 22*b* of the disk 22 of the feeding unit 20 shown in FIG. 5 and the like is gripped and removed from the disk 22 by the taking-out mechanism 28. FIGS. 14(*a*) to 14(*d*) sequentially illustrate an operation in which a coin caught by the protrusion 22*b* of the disk 22 of the feeding unit 20 shown in FIG. 5 and the like is gripped and removed from the disk 22 by the taking-out mechanism 28.

As shown in FIG. 14(*a*), the coin caught by the protrusion 22*b* is moved upward while the peripheral edge of the coin is in contact with the guide 26. In the case of a coin (indicated by reference character C2 in FIGS. 14(*a*) to 14(*d*)) having a large diameter, one coin is substantially caught by the protrusion 22*b*. Meanwhile, in the case of a coin (indicated by reference character C1 in FIGS. 14(*a*) to 14(*d*)) having a small diameter, a plurality of the coins may be caught by the protrusion 22*b*.

The coin caught by the protrusion 22*b* in the state shown in FIG. 14(*a*) is further moved upward, whereby the coin protruding from the disk 22 reaches the taking-out mechanism 28 as shown in FIG. 14(*b*). Specifically, as shown in FIG. 13, the coin protruding from the disk 22 is sent to a gap between the upper face member 282*a* and the body portion 282 of the taking-out mechanism 28.

The first upper face 283*a* of the cam 283 of the taking-out mechanism 28 is disposed near the outer peripheral edge of the disk 22. Therefore, the body portion 282 and the like rotate relative to the cam 283 and the first gripping member 284 thus approaches the outer peripheral edge of the disk 22, whereby the roller 284*b* of the first gripping member 284 is located on the first upper face 283*a* of the cam 283. Thus, the coin having been sent to the gap between the upper face member 282*a* and the body portion 282 of the taking-out mechanism 28 is gripped at one point by the contact pin 284*a* of the first gripping member 284. Specifically, the coin is gripped between the contact pin 284*a* and the upper face of the body portion 282.

Thus, according to the present embodiment, the contact pin 284*a* comes into contact with the coin so as to grip the coin between the contact pin 284*a* and the upper face of the body portion 282 at one point. Therefore, even if a plurality of coins each having a small diameter are caught by the protrusion 22*b*, only one coin is removed from the disk 22 by the taking-out mechanism 28. Therefore, the other coins fall down from the upper portion of the disk 22 due to their own weights, and are returned to the lower portion of the disk 22.

The body portion 282 and the like of the taking-out mechanism 28 rotate in a state shown in FIG. 14(*b*), to thereby move the first gripping member 284 away from the outer peripheral edge of the disk 22 in a state where the coin is gripped by the contact pin 284*a* of the first gripping member 284, as shown in FIG. 14(*c*). Then, as shown in FIG. 14(*d*), the first gripping member 284 approaches the pulley 31 of the transport unit 30.

The first gripping member 284 approaches the pulley 31 of the transport unit 30, whereby the roller 284*b* of the first gripping member 284 is moved through the tilted upper face 283*c* of the cam 283 onto the second upper face 283*b*. Therefore, the contact pin 284*a* of the first gripping member 284 is separated from the upper face of the body portion 282. Thus, the coin is released from the contact pin 284*a* of the first gripping member 284, and the released coin is delivered to the transport unit 30. The coin is caught by the protrusion 30*b* disposed at the belt 30*a* of the transport unit 30, and thus transported in the direction indicated by the arrow in FIG. 3. Thus, the coins are fed out one by one from the feeding unit 20 to the transport unit 30.

The coins having been fed out from the feeding unit 20 to the transport unit 30 are caught by the protrusions 30*b* disposed at the belt 30*a*, and thus transported in the direction indicated by the arrow in FIG. 3. The coin transported by the belt 30*a* along the coin transport path is detected by each of the detectors 42. Thus, in a case where abnormality in transportation occurs in the coin transported by the belt 30*a*, occurrence of the abnormality is detected by each of the detectors 42. When the coin transported by the belt 30*a* passes through the recognition unit 40, the recognition unit 40 performs recognition of a denomination, authentication, fitness, a transport state, and the like of the coin.

Among the coins having passed through the recognition unit 40, a coin (for example, a resin coin formed of resin) that has been detected by the detector 42 disposed upstream of the recognition unit 40 but cannot be recognized by the recognition unit 40 is sorted by the reject unit 56 from the transport unit 30. The coin sorted by the reject unit 56 is sent to the reject port 112.

Among the coins having passed through the recognition unit 40, a coin recognized as a normal coin by the recognition unit 40 is sorted from the transport unit 30 by the sorting unit 50 corresponding to the coin storage unit 60 to which the denomination of the coin is assigned. The coin sorted by the sorting unit 50 is sent to the coin storage unit 60 corresponding to the sorting unit 50, and stored in the coin storage unit 60.

In a case where the coin storage unit 60 corresponding to the denomination of the coin recognized by the recognition unit 40 is in a full state or a nearly full state, and coins cannot be further stored in the coin storage unit 60, the coin is not sorted by the sorting unit 50 corresponding to the coin storage unit 60. Instead, the coin is sorted by the overflow sorting unit 52 and sent from the transport unit 30 to the overflow box 106.

The coin recognized as a counterfeit coin by the recognition unit 40 is sorted by the counterfeit coin sorting unit 54 and sent from the transport unit 30 to the counterfeit coin box 108.

In a case where the coin transported by the belt 30*a* in the transport unit 30 is not sorted by any of the reject unit 56, each of the sorting units 50, the overflow sorting unit 52, and the counterfeit coin sorting unit 54, the coin is returned from the transport unit 30 to the feeding unit 20 by the guiding unit 38. Specifically, in a case where abnormality in transporting (for example, chaining or overlapping) of the coin is detected according to a coin detection result from the detector 42, such a coin is returned from the transport unit 30 to the feeding unit 20 by the guiding unit 38.

When a predetermined time (specifically, a time sufficient for feeding out all the coins stored in the feeding unit 20 to the transport unit 30 and storing the coins in each of the coin storage units 60) has elapsed since rotation of the disk 22 of the feeding unit 20 has started, the bottom of the feeding unit 20 is opened. By opening the bottom of the feeding unit 20, a foreign object such as a clip left in the feeding unit 20 falls down from the feeding unit 20 to the foreign object return box 110 due to its own weight and is stored in the foreign object return box 110.

Thus, the coin depositing performed by the coin depositing and dispensing machine 10 is completed.

Next, coin dispensing performed by the coin depositing and dispensing machine 10 will be described. Firstly, an instruction for starting coin dispensing is inputted to the controller 90, and information on the total monetary amount of coins to be dispensed or the number of coins for each denomination is inputted to the controller 90. Thus, coins to be dispensed are fed out from each of the coin storage units 60, and the coins having been fed out are stored in the storage drawer 102.

Thus, when all the coins to be dispensed have been fed out from each of the coin storage units 60, and stored in the storage drawer 102, dispensing of the coins in the coin depositing and dispensing machine 10 is completed. Thereafter, the operator is allowed to take out the coins to be dispensed, from the storage drawer 102, by drawing the storage drawer 102 through the front surface of the housing 12 to the front side.

Next, coin collection performed by the coin depositing and dispensing machine 10 will be described. The operator firstly stores the collection box 100 in the housing 12 and takes out the storage drawer 102 to outside of the housing 12. An instruction for starting coin collection is inputted to the controller 90, and, then, coins to be collected are fed out from each of the coin storage units 60 and the coins having been fed out are stored in the collection box 100. The coins to be collected may be all the coins stored in each of the coin storage units 60. Alternatively, a predetermined number of coins may be left as change fund in each of the coin storage units 60, and the other coins may be fed out as the coins to be collected from each of the coin storage units 60.

When all the coins to be collected have been fed out from each of the coin storage units 60 and sent to the collection box 100, the operator is allowed to collect the coins together with the collection box 100 by drawing the collection box 100 from the housing 12. Thus, the coin collection performed by the coin depositing and dispensing machine 10 is completed.

In the coin depositing and dispensing machine 10 of the present embodiment having the above-described configuration, the feeding unit 20 (coin feeding device) includes the disk 22, the cover 21, the guide 26, and the taking-out mechanism 28 (taking-out unit). The disk 22 has a plurality of protrusions **22*b* at the surface, is disposed so as to be rotatable in a tilted state, and catches a coin by the protrusion 22*b* to move the coin upward while rotating. The cover 21 forms a space for storing coins between the cover 21 and the surface of the disk 22. The guide 26 guides the peripheral edge of the coin such that a part of the coin having been caught by the protrusion 22*b* and moved upward protrudes from the disk 22. The taking-out mechanism 28 (taking-out unit) grips only one coin protruding from the disk 22, removes the coin from the disk 22, and discharges the coin to outside of the disk 22**.

In the feeding unit 20 having such a configuration, among the coins that have been caught by the protrusion **22*b* and moved upward, the taking-out mechanism 28 grips only one coin protruding from the disk 22, removes the coin from the disk 22, and discharges the coin to outside of the disk 22. Therefore, even if two or more coins having small coin diameters are caught by the protrusion 22*b* and moved upward, the two or more coins are not simultaneously discharged to outside of the disk 22. Thus, in handling of a plurality of kinds of coins, even if the coins having diameters greatly different from each other are fed out, the feeding unit 20 of the present embodiment can feed out the coins one by one by using the taking-out mechanism 28**.

Furthermore, in the feeding unit 20 of the present embodiment, as described above, the taking-out mechanism 28 has the first gripping member 284 and the second gripping member 285 (gripping portion) that approach the disk 22 in synchronization with approaching of the protrusion **22*b*. The first gripping member 284 and the second gripping member 285 perform the gripping operation of gripping one coin protruding from the disk 22 when approaching the disk 22, and perform the releasing operation of releasing the gripped coin when having moved away from the disk 22. In this case, since the first gripping member 284 and the second gripping member 285 that approach the disk 22 in synchronization with approaching of the protrusion 22*b* perform the coin gripping operation, even if the coins having diameters greatly different from each other are fed out in handling of a plurality of kinds of coins, one coin can be gripped by the first gripping member 284 or the second gripping member 285** and fed out.

Furthermore, as described above, in the releasing operation by the first gripping member 284 and the second gripping member 285, the contact pin **284*a*, 285*a* (contact portion) that comes into contact with a coin for gripping the coin is moved away from the upper surface of the body portion 282 over a distance greater than the largest thickness of thicknesses of coins to be handled. In the gripping operation thereby, the contact pin 284*a*, 285*a* approaches the upper surface of the body portion 282 such that a distance between the contact pin 284*a*, 285*a* and the upper surface of the body portion 282 is less than the smallest thickness of thicknesses of coins to be handled. In this case, the contact pin 284*a*, 285*a* approaches a coin and comes into contact with the coin to grip the coin in the gripping operation. Furthermore, the contact pin 284*a*, 285*a*** is moved away from the coin to release the gripped coin in the releasing operation.

Furthermore, as described above, the taking-out mechanism 28 has the cam 283 for moving the contact pins **284*a*, 285*a*. When the first gripping member 284 or the second gripping member 285 approaches the disk 22, the cam 283 allows the contact pin 284*a*, 285*a* to approach the upper surface of the body portion 282 such that a distance between the contact pin 284*a*, 285*a* and the upper surface of the body portion 282 is less than the smallest thickness of thicknesses of coins to be handled. Thus, when the first gripping member 284 or the second gripping member 285 approaches the disk 22, the contact pin 284*a*, 285*a*** approaches a coin and comes into contact with the coin to grip the coin in the gripping operation.

Furthermore, as described above, at least one of the contact pins **284*a*, 285*a* grips a coin at one point. Thus, also in a case where a plurality of coins are caught by the protrusion 22*b* and moved upward during rotation of the disk 22, only one coin can be gripped at one point by the contact pin 284*a*, 285*a*. Therefore, the taking-out mechanism 28** can be prevented from simultaneously discharging a plurality of coins.

Furthermore, as described above, the first gripping member 284 and the second gripping member 285 each grip a coin by a force for restoring the contracted compression springs **288*a*, 288*b* to neutral states. In this case, regardless of the thickness of the coin gripped by the first gripping member 284 and the second gripping member 285**, the coin can be more assuredly gripped.

Furthermore, as described above, the taking-out mechanism 28 rotates about the axis parallel to the rotation shaft (shaft **22*a*) of the disk 22. The taking-out mechanism 28 rotates in the direction opposite to the direction of rotation of the disk 22**.

The coin depositing and dispensing machine according to the present embodiment is not limited to the above-described configuration, and various modifications can be devised.

Figure 15:
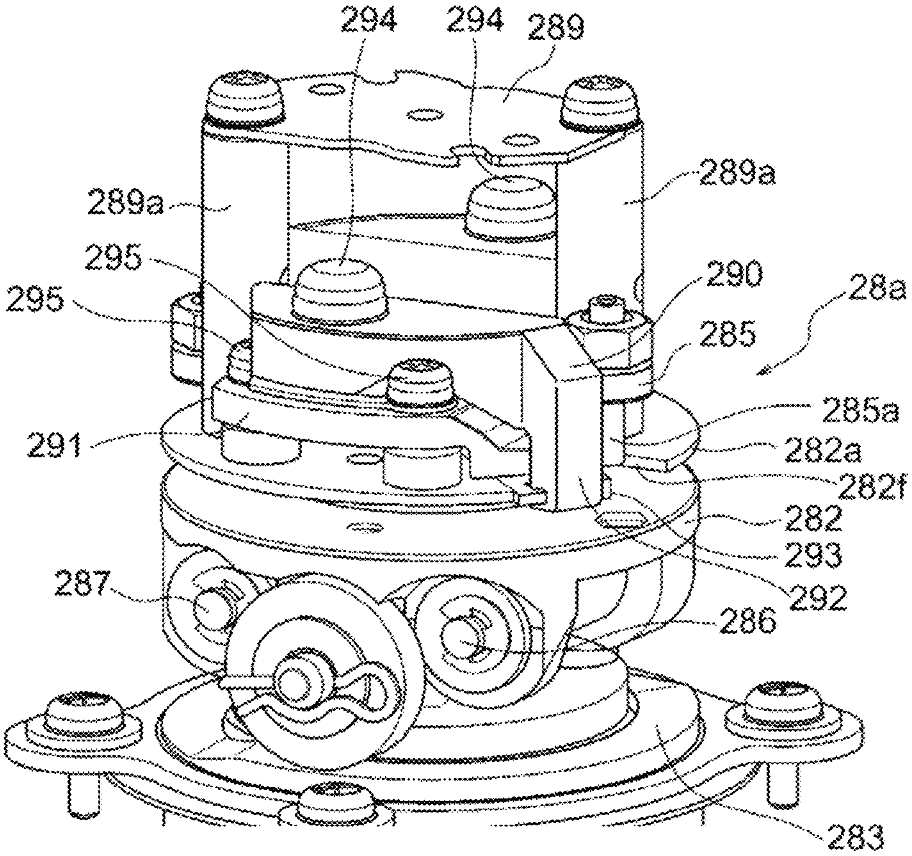
FIG. 15 is a perspective view of a configuration of a taking-out mechanism according to a modification.
Figure 16:
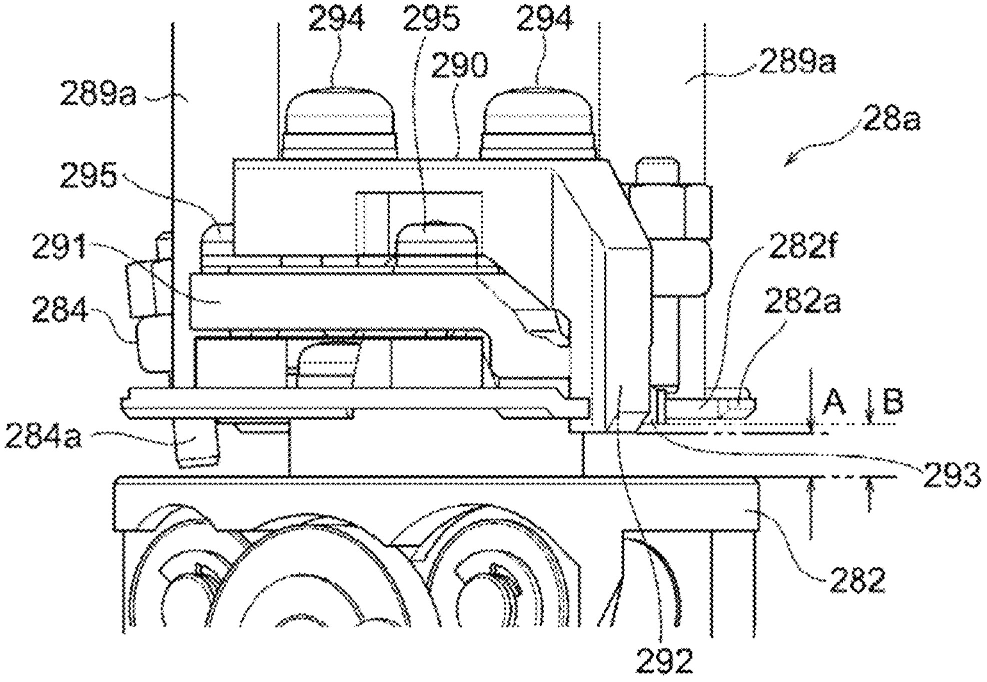
FIG. 16 is a side view of the taking-out mechanism shown in FIG. 15.

For example, a taking-out mechanism of the coin depositing and dispensing machine according to a modification may include a regulation member for preventing a plurality of coins from being simultaneously taken out. A configuration of such a regulation member will be described with reference to FIG. 15 and FIG. 16. FIG. 15 is a perspective view of a configuration of the taking-out mechanism according to the modification. FIG. 16 is a side view of the taking-out mechanism shown in FIG. 15. The regulation member shown in FIG. 15 and FIG. 16 regulates a gap formed, as a coin passage through which a coin passes, between the upper surface of the body portion 282 and the lower surface of the upper face member **282*a*, when the coin is gripped by the first gripping member 284 or the second gripping member 285 and taken out from the disk 22 to the transport unit 30**.

As shown in FIG. 15 and FIG. 16, in a taking-out mechanism **28*a* according to the modification, a first regulation member 290 is mounted to the upper face member 282*a* by screws 294. Furthermore, a cut portion 282*f* is formed at the upper face member 282*a*, and a projection 292 of the first regulation member 290 passes through the cut portion 282*f* and projects downward from the lower surface of the upper face member 282*a*. Thus, a distance (indicated by reference character A in FIG. 16) between the lower end of the projection 292 of the first regulation member 290 and the upper surface of the body portion 282 is less than a distance between the lower surface of the upper face member 282***a* and the upper surface of the body portion 282. The coin passage through which a coin passes when the coin is gripped by the first gripping member 284 or the second gripping member 285 and taken out from the disk 22 to the transport unit 30, is regulated according to the distance (indicated by reference character A in FIG. 16) between the lower end of the projection 292 of the first regulation member 290 and the upper surface of the body portion 282.

Furthermore, a second regulation member 291 is mounted to the upper face member 282*a* by screws 295. A projection 293 of the second regulation member 291 passes through the cut portion 282*f* of the upper face member 282*a* and projects downward from the lower surface of the upper face member 282*a*. Thus, a distance (indicated by reference character B in FIG. 16) between the lower end of the projection 293 of the second regulation member 291 and the upper surface of the body portion 282 is less than the distance between the lower surface of the upper face member 282*a* and the upper surface of the body portion 282. The distance B between the lower end of the projection 293 of the second regulation member 291 and the upper surface of the body portion 282 is greater than the distance A between the lower end of the projection 292 of the first regulation member 290 and the upper surface of the body portion 282. The coin passage through which a coin passes when the coin is gripped by the first gripping member 284 or the second gripping member 285 and taken out from the disk 22 to the transport unit 30, is regulated according to the distance (indicated by reference character B in FIG. 16) between the lower end of the projection 293 of the second regulation member 291 and the upper surface of the body portion 282.

In the taking-out mechanism 28*a* according to the modification, each of the first regulation member 290 and the second regulation member 291 can be dismounted from the upper face member 282*a*. In a case where a thickness of a coin to be inserted into the housing 12 of the coin depositing and dispensing machine 10 is relatively small, at least the first regulation member 290 is mounted to the upper face member 282*a*. At this time, the distance A between the lower end of the projection 292 of the first regulation member 290 and the upper surface of the body portion 282 is set to have a value less than twice a thickness of a coin having the smallest thickness of thicknesses of coins to be handled. Thus, before two or more overlapping coins are gripped by the contact pin 284*a*, 285*a* of the first gripping member 284 or the second gripping member 285, the overlapping coins fall down to a lower region of the feeding unit 20 by the first regulation member 290. Therefore, even in a case where a coin having the smallest thickness is inserted into the housing 12 of the coin depositing and dispensing machine 10 and fed out by the feeding unit 20, the first regulation member 290 can prevent two or more overlapping coins from being gripped by the contact pin 284*a*, 285*a* of the first gripping member 284 or the second gripping member 285 and sent to the transport unit 30.

Meanwhile, in a case where a thickness of a coin to be inserted into the housing 12 of the coin depositing and dispensing machine 10 is relatively large, the first regulation member 290 is dismounted from the upper face member 282*a* and the second regulation member 291 is mounted to the upper face member 282*a* instead. Thus, before two or more overlapping coins are gripped by the contact pin 284*a*, 285*a* of the first gripping member 284 or the second gripping member 285, the overlapping coins fall down to the lower region of the feeding unit 20 by the second regulation member 291 and, thus, the second regulation member 291 can prevent two or more overlapping coins from being sent to the transport unit 30. In a case where the thickness of a coin to be inserted into the housing 12 of the coin depositing and dispensing machine 10 is even larger, each of the first regulation member 290 and the second regulation member 291 is dismounted from the upper face member 282*a*. In a case where the distance between the lower surface of the upper face member 282*a* and the upper surface of the body portion 282 is less than twice the thickness of a coin to be inserted into the housing 12 of the coin depositing and dispensing machine 10, two or more coins can be prevented from being simultaneously taken out by the taking-out mechanism 28*a* and sent to the transport unit 30 even if the first regulation member 290 and the second regulation member 291 are not disposed since two or more overlapping coins cannot pass through a gap (coin passage) between the lower surface of the upper face member 282*a* and the upper surface of the body portion 282.

As described above, the taking-out mechanism 28*a* according to the modification shown in FIG. 15 and FIG. 16 includes the regulation members 290, 291 for preventing two or more overlapping coins from being gripped by the first gripping member 284 or the second gripping member 285 to prevent two or more coins from being simultaneously discharged to outside of the disk 22. Therefore, a plurality of coins can be prevented from being simultaneously fed out from the feeding unit 20 to the transport unit 30. At least one of the regulation members 290, 291 can be attached according to the thickness of the thickest coins handled and the thickness of the thinnest coins handled by the coin depositing and dispensing machine. It is also possible to not attach any of the regulation members 290, 291 according to the thickness of the thickest coins and the thickness of the thinnest coins handled by the coin depositing and dispensing machine.

Furthermore, the transport unit 30 having a configuration as shown in FIG. 17 to FIG. 20 may be used. As shown in FIG. 17 to FIG. 20, a guide 30*d* is disposed at the transport unit 30, and a coin that has been fed out from the feeding unit 20 and sent to the transport unit 30 is transported along the guide 30*d* (that is, in contact with the guide 30*d*) while caught by the protrusion 30*b*. In the transport unit 30, if a coin is not transported along the guide 30*d*, misrecognition may occur when the recognition unit 40 performs recognition of the coin, or the coin cannot be recognized by the recognition unit 40. In a case where a coin caught by the protrusion 30*b* is transported in a state where the coin is distant from the guide 30*d*, if the coin is further moved away from the guide 30*d*, the coin may be separated from the protrusion 30*b*. In this case, in a case where a coin caught by the succeeding protrusion 30*b* is transported, the two coins are located between the preceding and succeeding two protrusions 30*b*, and the sorting unit 50 cannot accurately sort the coins.

Figure 17:
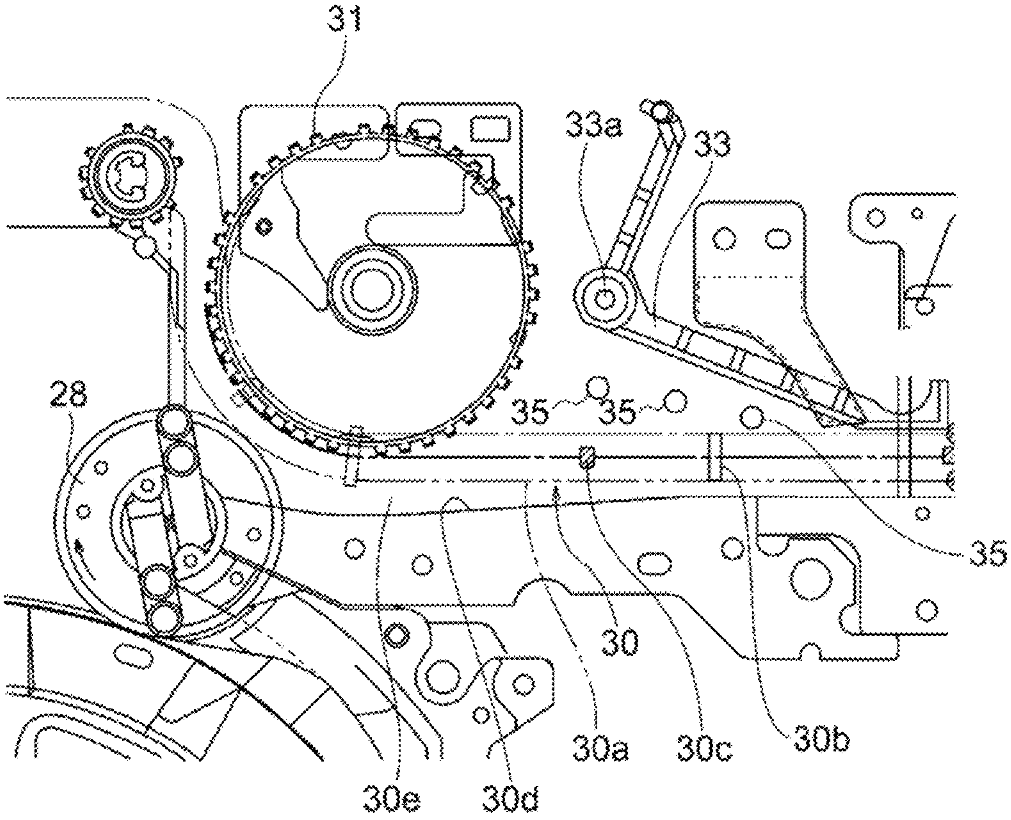
FIG. 17 is a configuration diagram illustrating a part of a configuration of the transport unit according to another modification.
Figure 18:
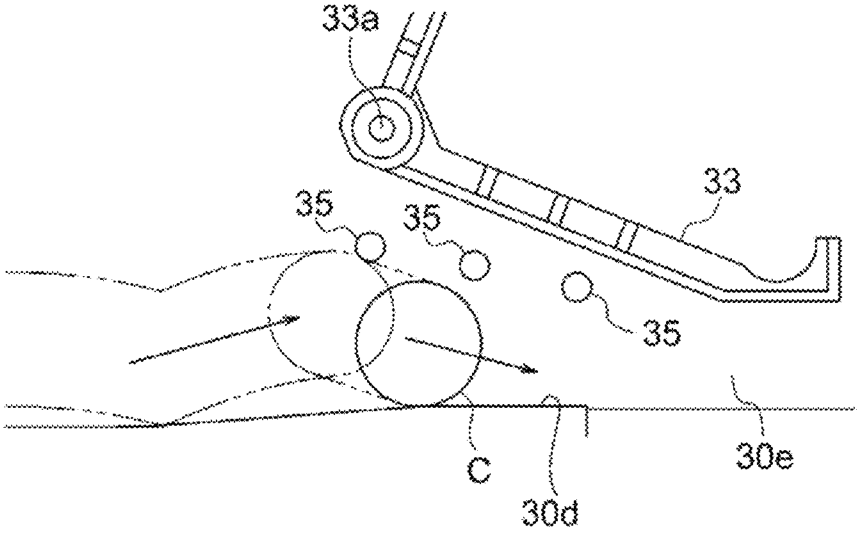
FIG. 18 is a configuration diagram illustrating an aligning lever and a plurality of press brushes shown in FIG. 17 in an enlarged manner.

An aligning lever 33 is disposed near the transport unit 30 in order to transport, along the guide 30*d*, coins that have been fed out from the feeding unit 20 to the transport unit 30. The aligning lever 33 is rotatable about a shaft 33*a*, and a force for clockwise rotation in FIG. 17 and FIG. 18 is constantly applied to the aligning lever 33 by a not-illustrated urging member such as a torsion spring. Thus, a coin that is caught by the protrusion 30*b* and transported is moved toward the guide 30*d* by the aligning lever 33 and comes into contact with the guide 30*d*.

Furthermore, in the transport unit 30 shown in FIG. 17 to FIG. 20, a plurality (three in the example shown in FIG. 17 and FIG. 18) of press brushes 35 are disposed at positions closer to the guide 30*d* than the aligning lever 33 is. The press brushes 35 are aligned along the direction in which the aligning lever 33 extends from the shaft 33*a*. Specifically, the press brushes 35 are disposed closer to the guide 30*d* toward the downstream side of the transport unit 30. In each of the press brushes 35, a brush portion extends toward a transport surface 30*e* (surface along the surface of the sheet in FIG. 17 and FIG. 18) for coins from a base portion disposed apart from the transport surface 30*e*, in the transport unit 30. A coin that is caught by the protrusion 30*b* and transported along the transport surface 30*e* comes into contact with the brush portion. Since the plurality of the press brushes 35 having such structures are disposed, a coin that is transported by the protrusion 30*b* while moving away from the guide 30*d* is also moved toward the guide 30*d* by coming into contact with the brush portions of the press brushes 35, as shown in FIG. 18.

Thus, the transport unit 30 shown in FIG. 17 to FIG. 20 has the aligning lever 33 and the plurality of press brushes 35, whereby the coin that has been fed out from the feeding unit 20 to the transport unit 30 can be more assuredly transported along the guide 30*d*.

In the transport unit 30 shown in FIG. 17 to FIG. 20, in addition to the plurality of the protrusions 30*b* disposed at regular intervals at the belt 30*a*, an additional protrusion 30*c* is disposed between the protrusions 30*b* at the belt 30*a*. The additional protrusion 30*c* prevents a coin that is caught by the protrusion 30*b* and transported from moving away from the protrusion 30*b* and close to another preceding protrusion 30*b*. The aligning lever 33 and the press brushes 35 described above can also prevent a coin that is caught by the protrusion 30*b* and transported from greatly preceding the protrusion 30*b*. However, when the coin has passed through the aligning lever 33 or the press brushes 35, the coin that is caught by the protrusion 30*b* and transported greatly precedes the protrusion 30*b* in some cases. In this case, the sorting unit 50 may not accurately sort the coin.

Figure 19:
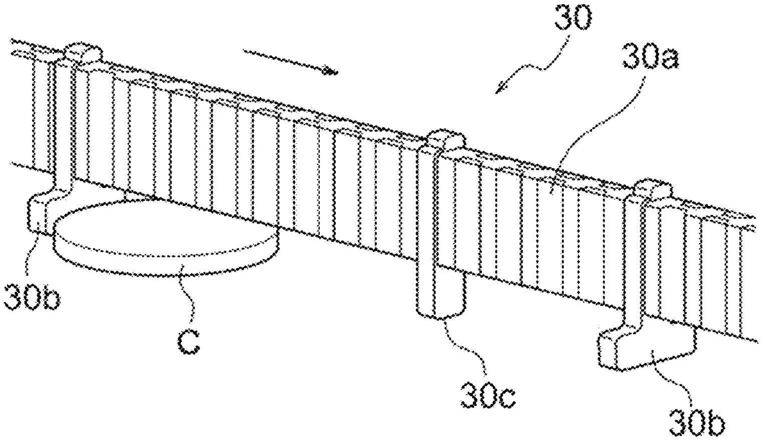
FIG. 19 is a perspective view of a configuration of the protrusions and an additional protrusion disposed at a belt shown in FIG. 17.
Figure 20:
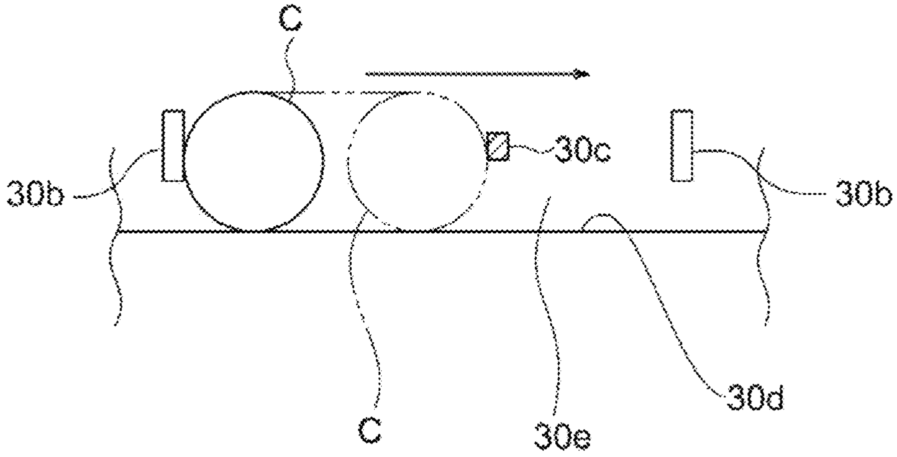
FIG. 20 illustrates a positional relationship between the protrusions and the additional protrusion shown in FIG. 19.

Meanwhile, in the transport unit 30 shown in FIG. 19 and FIG. 20, the additional protrusion 30*c* is disposed between the paired protrusions 30*b*. Thus, a range in which a coin that is caught by the protrusion 30*b* and transported is movable becomes narrow, and the coin can be prevented from being moved greatly away from the protrusion 30*b* and close to another preceding protrusion 30*b*.

Furthermore, the taking-out mechanism (taking-out unit) for gripping only one coin protruding from the disk, removing the coin from the disk, and discharging the coin to outside of the disk is not limited to the configuration shown in FIG. 6 to FIG. 14(*d*). The taking-out mechanism may have another configuration as long as only one coin protruding from the disk can be gripped and removed from the disk.

For example, as the taking-out mechanism (taking-out unit), a unit that is movable between a position close to the disk and a position apart from the disk without rotating about the axis parallel to the rotation shaft of the disk, may be used. Specifically, a gripping member (gripping portion) of the taking-out mechanism linearly moves between the position close to the disk and the position apart from the disk. Also in this case, only one coin protruding from the disk can be gripped and removed from the disk by the taking-out mechanism.

Furthermore, the coin feeding device according to the present invention may be disposed for each of the coin storage units 60. That is, the disk that has a plurality of protrusions at the surface, is disposed so as to be rotatable in a tilted state, and catches a coin by the protrusion to move the coin upward while rotating, a cover that forms a space for storing coins between the cover and the surface of the disk, a guide that guides the peripheral edge of the coin such that a part of the coin having been caught by the protrusion and moved upward protrudes from the disk, and the taking-out mechanism (taking-out unit) that grips only one coin protruding from the disk, removes the coin from the disk, and discharges the coin to outside of the disk, may be disposed in each of the coin storage units 60.

Furthermore, the coin depositing and dispensing machine according to the present embodiment is installed in, for example, a back office region of a store or financial institution. However, the present invention is not limited thereto. The coin depositing and dispensing machine according to the present embodiment may be used as, for example, a money change machine in a front office region of a store.

The invention claimed is:

1. A coin feeding device, comprising:

a disk having a plurality of protrusions on a surface of the disk, the disk disposed so as to be rotatable in a tilted state, and the disk configured to catch coins by the protrusions to move the coins upward while rotating;

a cover configured to form a space for storing a coin between the cover and the surface of the disk;

a guide configured to guide a peripheral edge of a coin, while the peripheral edge of the coin is in contact with the guide, such that a part of the coin having been caught by each protrusion and moved upward protrudes from the disk; and a taking-out mechanism configured to grip one coin protruding from the disk, remove the coin from the disk, and discharge the coin to outside of the disk, wherein the guide is provided out of the disk such that a gap is formed between the guide and an outer peripheral edge of the disk, and in a case where the disk rotates, a centrifugal force acts on the coin caught by the protrusion, and the coin is moved toward the guide and brought into contact with the guide.

2. The coin feeding device according to claim 1, wherein the taking-out mechanism includes a gripping portion that approaches the disk in synchronization with approaching of the protrusion, and the gripping portion performs a gripping operation of gripping one coin protruding from the disk when approaching the disk, and performs a releasing operation of releasing the gripped coin when having moved away from the disk.

3. The coin feeding device according to claim 2, wherein the gripping portion performs the releasing operation in which a contact portion that comes into contact with a coin for gripping the coin is moved away from an upper surface of a body portion over a distance greater than a largest thickness of thicknesses of coins to be handled, and performs the gripping operation in which the contact portion approaches the upper surface of the body portion such that a distance between the contact portion and the upper surface of the body portion is less than a smallest thickness of thicknesses of coins to be handled.

4. The coin feeding device according to claim 3, wherein the gripping portion grips a coin between the upper surface of the body portion and the gripping portion.

5. The coin feeding device according to claim 3, wherein the taking-out mechanism further includes a cam for moving the contact portion, and the cam allows the contact portion to approach the upper surface of the body portion such that a distance between the contact portion and the upper surface of the body portion is less than the smallest thickness of thicknesses of coins to be handled when the gripping portion approaches the disk.

6. The coin feeding device according to claim 3, wherein at least one contact portion grips the coin at one point.

7. The coin feeding device according to claim 2, wherein the gripping portion grips a coin by a force for restoring a contracted spring to a neutral state.

8. The coin feeding device according to claim 2, wherein the taking-out mechanism includes a regulator for preventing two or more overlapping coins from being gripped by the gripping portion, to prevent two or more coins from being simultaneously discharged to outside of the disk.

9. The coin feeding device according to claim 8, wherein the regulator regulates a coin passage of the surface of the body portion through which coins protruding from the disk pass.

10. The coin feeding device according to claim 8, wherein the regulator is detachable from the taking-out mechanism.

11. The coin feeding device according to claim 9, wherein a plurality of the regulators are disposed, and each of the regulators regulates a coin passage of the surface of the body portion.

12. The coin feeding device according to claim 11, wherein each of the regulators is detachable from the taking-out mechanism.

13. The coin feeding device according to claim 1, wherein the taking-out mechanism rotates about an axis parallel to a rotation shaft of the disk.

14. The coin feeding device according to claim 13, wherein the taking-out mechanism rotates in a direction opposite to a rotation direction of the disk.

15. The coin feeding device according to claim 1, wherein the taking-out mechanism is movable between a position close to the disk and a position apart from the disk.

16. The coin feeding device according to claim 1, wherein the guide is further away from a center of the disk than the plurality of protrusions are from the center of the disk.

17. The coin feeding device according to claim 1, wherein the disk, the plurality of protrusions and the guide all intersect a same plane.

18. The coin feeding device according to claim 1, wherein the taking-out mechanism is further away from a center of the disk than the plurality of protrusions are from the center of the disk.

19. The coin feeding device according to claim 1, wherein the disk, the plurality of protrusions and the taking-out mechanism all intersect a same plane.

20. The coin feeding device according to claim 1, wherein the gap is along a direction parallel to a radius of the disk.

* * * * *